United States Patent
Damnjanovic et al.

(10) Patent No.: US 8,996,414 B2
(45) Date of Patent: Mar. 31, 2015

(54) SYSTEM AND METHOD FOR CERTIFYING AND MONITORING COMMERCIAL ACTIVITY OF A MANUFACTURER, DISTRIBUTORS, AND RETAILERS IN A PRODUCT SUPPLY CHAIN

(71) Applicants: Budimir Damnjanovic, Livonia, MI (US); Desanka Damnjanovic, Livonia, MI (US)

(72) Inventors: Budimir Damnjanovic, Livonia, MI (US); Desanka Damnjanovic, Livonia, MI (US)

(*) Notice: Subject to any disclaimer, the term of this patent is extended or adjusted under 35 U.S.C. 154(b) by 0 days.

(21) Appl. No.: 14/154,142

(22) Filed: Jan. 13, 2014

(65) Prior Publication Data

US 2014/0129458 A1    May 8, 2014

Related U.S. Application Data

(63) Continuation-in-part of application No. 13/562,185, filed on Jul. 30, 2012.

(51) Int. Cl.
*G06Q 30/00* (2012.01)
*G06Q 30/06* (2012.01)

(52) U.S. Cl.
CPC ............ *G06Q 30/018* (2013.01); *G06Q 30/06* (2013.01); *G06Q 30/0609* (2013.01); *G06Q 30/0623* (2013.01)
USPC .......................................................... 705/28

(58) Field of Classification Search
CPC ...... G06Q 10/087; G06Q 10/06; G06Q 10/08
USPC ............................................................. 705/28
See application file for complete search history.

(56) References Cited

U.S. PATENT DOCUMENTS

| | | | | |
|---|---|---|---|---|
| 8,019,662 | B2 * | 9/2011 | Lucas | 705/28 |
| 2005/0004838 | A1 * | 1/2005 | Perkowski et al. | 705/14 |
| 2005/0097013 | A1 * | 5/2005 | Kelly et al. | 705/28 |
| 2013/0282550 | A1 * | 10/2013 | Sycoff | 705/37 |

OTHER PUBLICATIONS

Regola, Nathan James. Infrastructure for big data. University of Notre Dame, ProQuest, UMI Dissertations Publishing, 2012.*

* cited by examiner

*Primary Examiner* — Ryan Zeender
*Assistant Examiner* — Fawaad Haider
(74) *Attorney, Agent, or Firm* — Buckert Patent & Trademark Law Firm, PC; John F. Buckert

(57) ABSTRACT

A method and a system for certifying and monitoring commercial activity of manufacturers, distributors, and retailers are provided. The method includes registering a manufacturer with a certification and monitoring company. The method includes certifying the distributor and first and second retailers by the manufacturer for a product. The method includes inputting a first quantity of the product shipped during a time period from the manufacturer to the distributor, by the manufacturer, and inputting second and third quantities of the product shipped during the time period from the distributor to the first and second retailers, by the distributor. If a sum of the second and third quantities is greater than the first quantity by a predetermined amount, then a first notification message is generated.

20 Claims, 27 Drawing Sheets

| | | SEDS | | |
|---|---|---|---|---|
| Registration | Log-in | Product Purchase | Product Tracking | Product Authentication |
| Owner | Owner | Consumer | Owner | Product Tracking Search |
| Manufacturer | Manufacturer | Retailer | Manufacturer | Product ID Search |
| Distributor - Dealer | Distributor - Dealer | Distributor - Dealer | Distributor - Dealer | Customs |
| Shipper - Carrier | Shipper - Carrier | | Shipper - Carrier | |
| International Carrier | International Carrier | | International Carrier | |
| Customs | Customs | | Customs | |
| Retailer | Retailer | | Retailer | |
| Consumer | Consumer | | Consumer | |

SEDS - Sign In — 66

Sign in to your SED.COM account to place an order and to access your personal information, previous orders and more. ← 68

Enter User ID ← 70

Enter Password ← 72

Sign In ← 74

Forgot your user ID? ← 76

Forgot your password? ← 78

Home ← 188

FIG. 4A

SEDS - Forgotten User ID or Password? — 80

Enter the information below as it appears in your personal information section of your account. ← 82

Enter E-mail Address * ← 84

Open Your E-mail for user ID and Password information. ← 86

If you cannot access your E-mail account, call SEDS' customer service at 1-xxx-xxx-xxxx, 24 hours a day, 7 days a week for assistance. ← 88

Asterisk (*) is a required field ← 90

Home ← 188

SEDS - Registration Form

- First Name * ← 100
- Last Name * ← 102
- User ID * ← 104
  - Must contain 6-30 characters
  - Must contain numbers, letters or space characters (e.g. @, #, $, %)
  - Must not include spaces
  - Letters can be upper or lower case
  - Passwords are case sensitive
  - Must not contain words SED or SEDS in upper or lower case
  ← 106
- E-mail Address * ← 108
- Confirm E-mail Address * ← 110
- Password * ← 112
- Confirm Password * ← 114
- Security Question * ← 116
- Answer to Security Questions * ← 120

118, 119

Select Question

Will you be using this account for governmental purchases? * ← 122

Yes | No ← 126
124
Asterisk (*) is a required field ← 98

Home ← 188

| SEDS - Distribution - Product Receipt Confirmation | − | ☐ | X |

- Distribution Chain Member ← 404
- Address ← 406
- Phone Number ← 408
- E-mail ← 410
- Product Name ← 412
- Product ID(s) or Lot Numbers ← 414
- Shipping Party ← 416
- Receipt Date ← 418
- Quantity ← 420
- Other Information ← 422

424 → SUBMIT

Home
188

FIG. 7

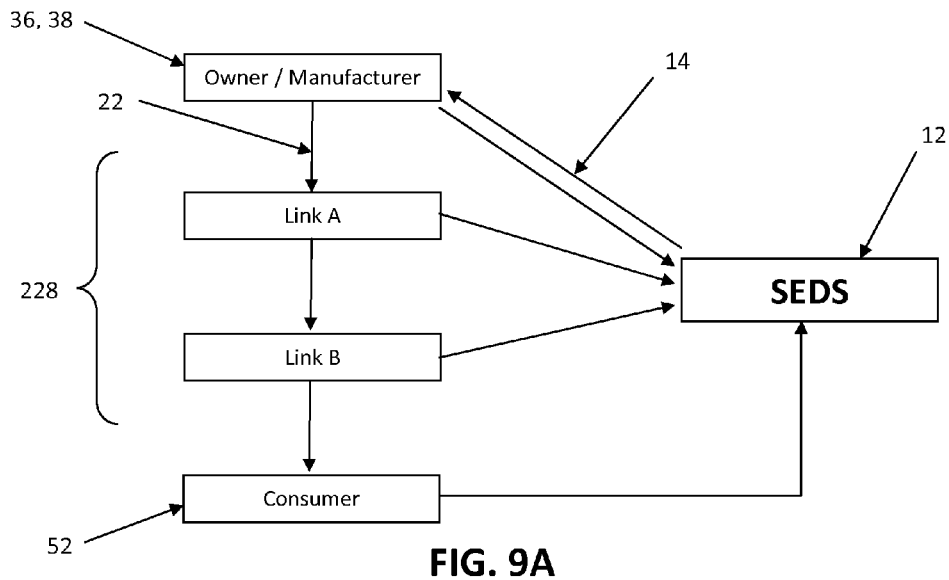
FIG. 9A
FIG. 9B
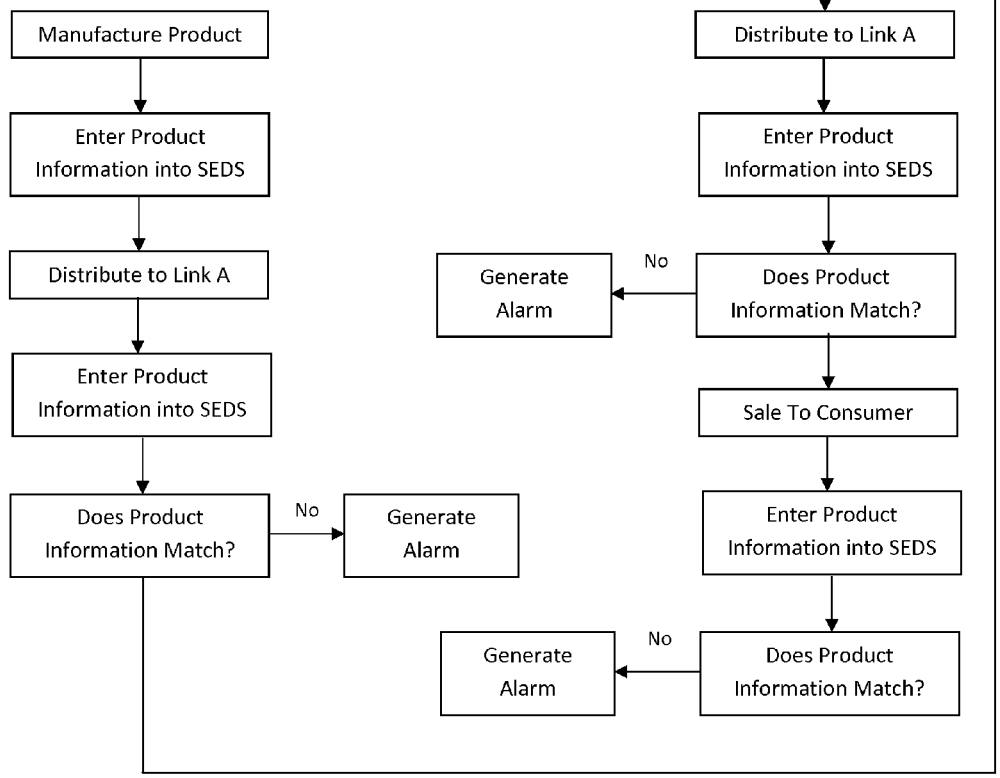

LOGIN WEB PAGE — 770

- MANUFACTURER LOGIN — 772
- DISTRIBUTION LOGIN — 774
- RETAILER LOGIN — 776
- AUTHENTICATE PRODUCT — 778

USER NAME — 780
PASSWORD — 782

LOGIN — 784

FIG. 11

MANUFACTURER REGISTRATION WEB PAGE — 800

- MANUFACTURER NAME — 802
- ADDRESS — 804
- TELEPHONE NO. — 806
- STATE OF INCORPORATION — 808
- EMAIL ADDRESS — 810
- CONTACT PERSON — 812

SUBMIT — 814    EXIT — 816

FIG. 12

SELECT DISTRIBUTOR WEB PAGE — 890

- DISTRIBUTOR NAME — 892
- ADDRESS — 894
- TELEPHONE NO. — 896
- EMAIL ADDRESS — 898
- CONTACT PERSON — 900

SUBMIT — 902  EXIT — 904

*FIG. 15*

SELECT RETAILER WEB PAGE — 920

- RETAILER NAME — 922
- ADDRESS — 924
- TELEPHONE NO. — 926
- EMAIL ADDRESS — 928
- CONTACT PERSON — 930

SUBMIT — 932  EXIT — 934

*FIG. 16*

```
┌─────────────────────────────────────────────────────────────┐
│ CERTIFICATION AND MONITORING COMPANY PROVIDES A CENTRAL     │
│ COMPUTER SERVER THAT IS OWNED AND MANAGED BY THE            │
│ CERTIFICATION AND MONITORING COMPANY, THE COMPUTER SERVER   │
│ HAVING A CERTIFICATION AND MONITORING SOFTWARE SYSTEM       │
│ PROGRAMMED TO GENERATE (1) A LOGIN WEB PAGE, (2) A          │
│ MANUFACTURER REGISTRATION WEB PAGE, (3) A MANUFACTURER      │
│ SELECTION WEB PAGE, (4) A PRODUCT WEB PAGE, (5) A SELECT    │
│ DISTRIBUTOR WEB PAGE, (6) A SELECT RETAILER WEB PAGE, (7) A │
│ MANUFACTURER SHIPMENT WEB PAGE, (8) A DISTRIBUTOR SHIPMENT  │
│ WEB PAGE, (9) A RETAILER WEB PAGE, (10) A PRODUCT           │
│ AUTHENTICATION WEB PAGE, (11) A NOTIFICATION WEB PAGE,      │
│ AND (12) A DE-CERTIFICATION WEB PAGE                        │
└─────────────────────────────────────────────────────────────┘
                              │  ─1200
                              ▼      ─1202
┌─────────────────────────────────────────────────────────────┐
│ MANUFACTURER PROVIDES A FIRST COMPUTER PROGRAMMED TO        │
│ OPERABLY COMMUNICATE WITH THE CENTRAL COMPUTER SERVER, THE  │
│ FIRST COMPUTER BEING OPERABLY COUPLED TO A FIRST DISPLAY    │
│ DEVICE, THE FIRST COMPUTER FURTHER PROGRAMMED TO INDUCE     │
│ THE FIRST DISPLAY DEVICE TO SELECTIVELY DISPLAY (1) THE     │
│ LOGIN WEB PAGE, (2) THE MANUFACTURER REGISTRATION WEB PAGE, │
│ (3) THE MANUFACTURER SELECTION WEB PAGE, (4) THE PRODUCT    │
│ WEB PAGE, (5) THE SELECT DISTRIBUTOR WEB PAGE, (6) THE      │
│ SELECT RETAILER WEB PAGE, (7) THE MANUFACTURER SHIPMENT     │
│ WEB PAGE, (8) A NOTIFICATION WEB PAGE, AND (9) A            │
│ DE-CERTIFICATION WEB PAGE                                   │
└─────────────────────────────────────────────────────────────┘
                              │  ─1204
                              ▼
┌─────────────────────────────────────────────────────────────┐
│ FIRST COMPUTER DISPLAYS THE LOGIN WEB PAGE ON THE FIRST     │
│                       DISPLAY DEVICE                        │
└─────────────────────────────────────────────────────────────┘
                              │  ─1206
                              ▼
┌─────────────────────────────────────────────────────────────┐
│ MANUFACTURER LOGS INTO THE CENTRAL COMPUTER SERVER BY       │
│ INPUTTING A USER NAME AND A PASSWORD, UTILIZING THE LOGIN   │
│                         WEB PAGE                            │
└─────────────────────────────────────────────────────────────┘
                              │  ─1208
      (B)                     ▼
     FROM    ┌─────────────────────────────────────────────────┐
     STEP →  │ FIRST COMPUTER DISPLAYS THE MANUFACTURER        │
     1222    │ REGISTRATION WEB PAGE ON THE FIRST DISPLAY      │
             │ DEVICE                                          │
             └─────────────────────────────────────────────────┘
                              │  ─1210
                              ▼
┌─────────────────────────────────────────────────────────────┐
│ MANUFACTURER INPUTS (1) A BUSINESS NAME OF THE              │
│ MANUFACTURER, (2) A BUSINESS ADDRESS OF THE MANUFACTURER    │
│ (3) A STATE OF INCORPORATION ASSOCIATED WITH THE BUSINESS   │
│ NAME, (4) A TELEPHONE NUMBER OF THE MANUFACTURER, (5) AN    │
│ EMAIL ADDRESS ASSOCIATED WITH THE MANUFACTURER, AND (6) A   │
│ NAME OF A CONTACT PERSON ASSOCIATED WITH THE MANUFACTURER,  │
│ UTILIZING THE MANUFACTURER REGISTRATION WEB PAGE            │
└─────────────────────────────────────────────────────────────┘
                              │
                              ▼
                          (A) TO STEP 1220
```

*FIG. 23*

FIRST RETAILER

FIRST RETAILER PROVIDES A THIRD COMPUTER PROGRAMMED TO OPERABLY COMMUNICATE WITH THE CENTRAL COMPUTER SERVER, THE THIRD COMPUTER BEING OPERABLY COUPLED TO A THIRD DISPLAY DEVICE, THE THIRD COMPUTER FURTHER PROGRAMMED TO INDUCE THE THIRD DISPLAY DEVICE TO DISPLAY THE LOGIN WEB PAGE AND THE RETAILER WEB PAGE — 1330

↓

THIRD COMPUTER DISPLAYS THE LOGIN WEB PAGE ON THE THIRD DISPLAY DEVICE — 1332

↓

FIRST RETAILER LOGS INTO THE COMPUTER SERVER BY INPUTTING A USER NAME AND A PASSWORD, UTILIZING THE LOGIN WEB PAGE — 1334

↓

THIRD COMPUTER DISPLAYS THE RETAILER WEB PAGE ON THE THIRD DISPLAY DEVICE — 1336

↓

FIRST RETAILER INPUTS (1) A FOURTH QUANTITY OF THE PRODUCT SOLD BY THE FIRST RETAILER, (2) A DATE OF SALE OF THE PRODUCT DURING THE TIME PERIOD, (3) A PRODUCT NAME OF THE PRODUCT, (4) A PRODUCT SERIAL NUMBER OF THE PRODUCT, AND (5) A PRODUCT MODEL NUMBER OF THE PRODUCT, UTILIZING THE RETAILER WEB PAGE — 1338

SECOND RETAILER

↓

SECOND RETAILER PROVIDES A FOURTH COMPUTER PROGRAMMED TO OPERABLY COMMUNICATE WITH THE CENTRAL COMPUTER SERVER, THE FOURTH COMPUTER BEING OPERABLY COUPLED TO A FOURTH DISPLAY DEVICE, THE FOURTH COMPUTER FURTHER PROGRAMMED TO INDUCE THE FOURTH DISPLAY DEVICE TO DISPLAY THE LOGIN WEB PAGE AND THE RETAILER WEB PAGE — 1340

↓

FOURTH COMPUTER DISPLAYS THE LOGIN WEB PAGE ON THE FOURTH DISPLAY DEVICE — 1342

↓

(J) TO STEP 1350

*FIG. 31*

SYSTEM AND METHOD FOR CERTIFYING AND MONITORING COMMERCIAL ACTIVITY OF A MANUFACTURER, DISTRIBUTORS, AND RETAILERS IN A PRODUCT SUPPLY CHAIN

CROSS-REFERENCE TO RELATED APPLICATIONS

The present application is a continuation-in-part of U.S. patent application Ser. No. 13/562,185 filed on Jul. 30, 2012, the contents of which are incorporated herein by reference thereto in its entirety.

BACKGROUND

Counterfeit products are being undesirably produced around the world. Since the counterfeit products can be secretly introduced at various points in a product supply chain and can include a wide spectrum of goods at various pricing levels, the counterfeit products can undermine the finances of legitimate manufacturers, distributors, and retailers. Further, the counterfeit products can adversely affect the health and safety of customers.

Accordingly, the inventors herein have recognized a need for an improved system and method for certifying and monitoring commercial activity of a manufacturer, distributors, and retailers in a product supply chain that will reduce the above-mentioned problem.

SUMMARY

A method for certifying and monitoring commercial activity of a manufacturer, distributors, and retailers in a product supply chain in accordance with an exemplary embodiment is provided. The method includes logging into a central computer server that is owned and managed by a certification and monitoring company utilizing a login web page, by a manufacturer. The central computer server has a certification and monitoring software program programmed to generate the login web page, a manufacturer registration web page, a select distributor web page, a select retailer web page, a manufacturer shipment web page, a distributor shipment web page, and a notification web page. The method further includes inputting a business name of a manufacturer and a state of incorporation associated with the business name utilizing the manufacturer registration web page. The method further includes verifying whether the business name of the manufacturer is registered with the state of incorporation by accessing a database utilizing the central computer server. The method further includes registering and certifying the manufacturer with the centralized certification and monitoring company utilizing the central computer server if the business name of the manufacturer is registered with the state of incorporation. The method further includes after registering and certifying the manufacturer with the centralized certification and monitoring company then performing the following steps. The method further includes selecting and certifying a distributor by the manufacturer, for a product manufactured by the manufacturer, utilizing the select distributor web page. The method further includes selecting and certifying first and second retailers by the manufacturer, for the product, utilizing the select retailer web page. The method further includes inputting a first quantity of the product shipped during a time period from the manufacturer to the distributor, by the manufacturer, utilizing the manufacturer shipment web page. The method further includes inputting second and third quantities of the product shipped during the time period from the distributor to the first and second retailers, by the distributor, utilizing the distributor shipment web page. The method further includes if a sum of the second and third quantities is greater than the first quantity by a predetermined amount, then generating a first notification message on the notification web page associated with the manufacturer. The first notification message indicates that the distributor has shipped an amount of the product greater than an amount of the product received from the manufacturer during the time period.

A system for certifying and monitoring commercial activity of a manufacturer, distributors, and retailers in a product supply chain in accordance with another exemplary embodiment is provided. The system includes a central computer server that is owned and managed by a certification and monitoring company. The central computer server has a certification and monitoring software program programmed to generate a login web page, a manufacturer registration web page, a select distributor web page, a select retailer web page, a manufacturer shipment web page, a distributor shipment web page, and a notification web page. The system further includes a computer programmed to operably communicate with the central computer server. The computer is operably coupled to a display device. The computer is further programmed to induce the display device to selectively display the login web page, the manufacturer registration web page, the select distributor web page, the select retailer web page, the manufacturer shipment web page, the distributor shipment web page, and the notification web page. The manufacturer registration web page is programmed to receive an inputted business name of the manufacturer and a state of incorporation associated with the business name, from the manufacturer. The central computer server is further programmed to verify whether the business name of the manufacturer is registered with the state of incorporation by accessing a database. The central computer server is further programmed to register and certify the manufacturer with the centralized certification and monitoring company if the business name is registered with the state of incorporation. After the central computer server registers and certifies the manufacturer with the centralized certification and monitoring company then the following web pages are utilized. The select distributor web page is programmed to receive data to select and to certify a distributor, from a manufacturer, for a product manufactured by the manufacturer. The select retailer web page is programmed to receive data to select and certify first and second retailers, from the manufacturer, for the product. The manufacturer shipment web page is programmed to receive an inputted first quantity of the product shipped during a time period from the manufacturer to the distributor, from the manufacturer. The distributor shipment web page is programmed to receive inputted second and third quantities of the product shipped during the time period from the distributor to the first and second retailers, from the distributor. The central computer server is further programmed to determine whether a sum of the second and third quantities is greater than the first quantity by a predetermined amount. The central computer server is further programmed to generate a first notification message on the notification web page associated with the manufacturer. The first notification message indicates that the distributor has shipped an amount of the product greater than an amount of the product received from the manufacturer during the time period, if the sum of the second and third quantities is greater than the first quantity by the predetermined amount.

BRIEF DESCRIPTION OF THE DRAWINGS

FIG. 4A is a schematic of a portion of a sign-in page of a search engine data server;

FIG. 4B is a schematic of a portion of a recovering forgotten user ID or password sign-in page of a search engine data server;

FIG. 5A is a schematic of a first registration page of a search engine data server;

FIG. 7 is a schematic of a distribution and product receipt confirmation page of a search engine data server;

FIG. 9A is a schematic of a distribution process;

FIG. 9B is a flowchart of the distribution process of FIG. 9A;

FIG. 11 is a schematic of a login web page utilized in the system of FIG. 10;

FIG. 12 is a schematic of a manufacturer registration web page utilized in the system of FIG. 10;

FIG. 15 is a schematic of a select distributor web page utilized in the system of FIG. 10;

FIG. 16 is a schematic of a select retailer web page utilized in the system of FIG. 10;

FIGS. 23-33 are flowcharts of a method for certifying and monitoring commercial activity of a manufacturer, a distributor, and retailers in a product supply chain, in accordance with another exemplary embodiment.

DETAILED DESCRIPTION

For purposes of understanding, the term "manufacturer" means a producer or maker of a product, or a brand name owner that authorizes another entity to produce or make the product for the brand name owner. The term "distributor" means a distributor of a product. The term "retailer" means a seller of the product. Further, the term "customer" means a party that purchases the product. For a final purchase where no additional modification or value adding process is involved, the customer is usually an individual, corporation, or a government agency. However, a customer may be a wholesaler, broker, consolidator, re-packager, institutional buyer, government and private manufacturer who adds value to the product by using them in other products. The terms "customer", "consumer" and "end-user" are construed herein to have the same meaning. The term "vendor" is a general term for a supplier and can be construed to have the same meaning as a wholesaler, distributor, broker, consolidator, re-packager, retailer, or a seller.

Exemplary embodiments include methods and systems for authenticating manufacturers, distributors, retailers, and associated products that are purchased or provided for purchase. The methods and systems provide assurances to certified manufactures that substantially only authenticated products being sold to consumers through authenticated and certified vendors. Similarly, the methods and systems further provide assurances to a purchaser that products being purchased have been or can be authenticated. Advantageously, each participating business entity is ensured and can provide suitable marking, e.g. SEDS™, informing consumers that products purchased under the SEDS label is assured, to a high degree, that the products are genuine. The authentication features reduce the number of counterfeit and pirated products entering the market, particularly through authenticated product. Further, the methods and systems alert manufactures, or intellectual property owners of products, when a counterfeit product may have entered a product distribution channel.

In one exemplary embodiment, the methods and systems utilize a search engine data server that is accessible by one or more parties along product distribution channel for validating goods, confirming validity of goods or both. The methods and systems further include an alarm system and process for warning manufactures, intellectual property owners, or otherwise, that a counterfeit product may have entered the product distribution channel.

Figures 1A, 1B:
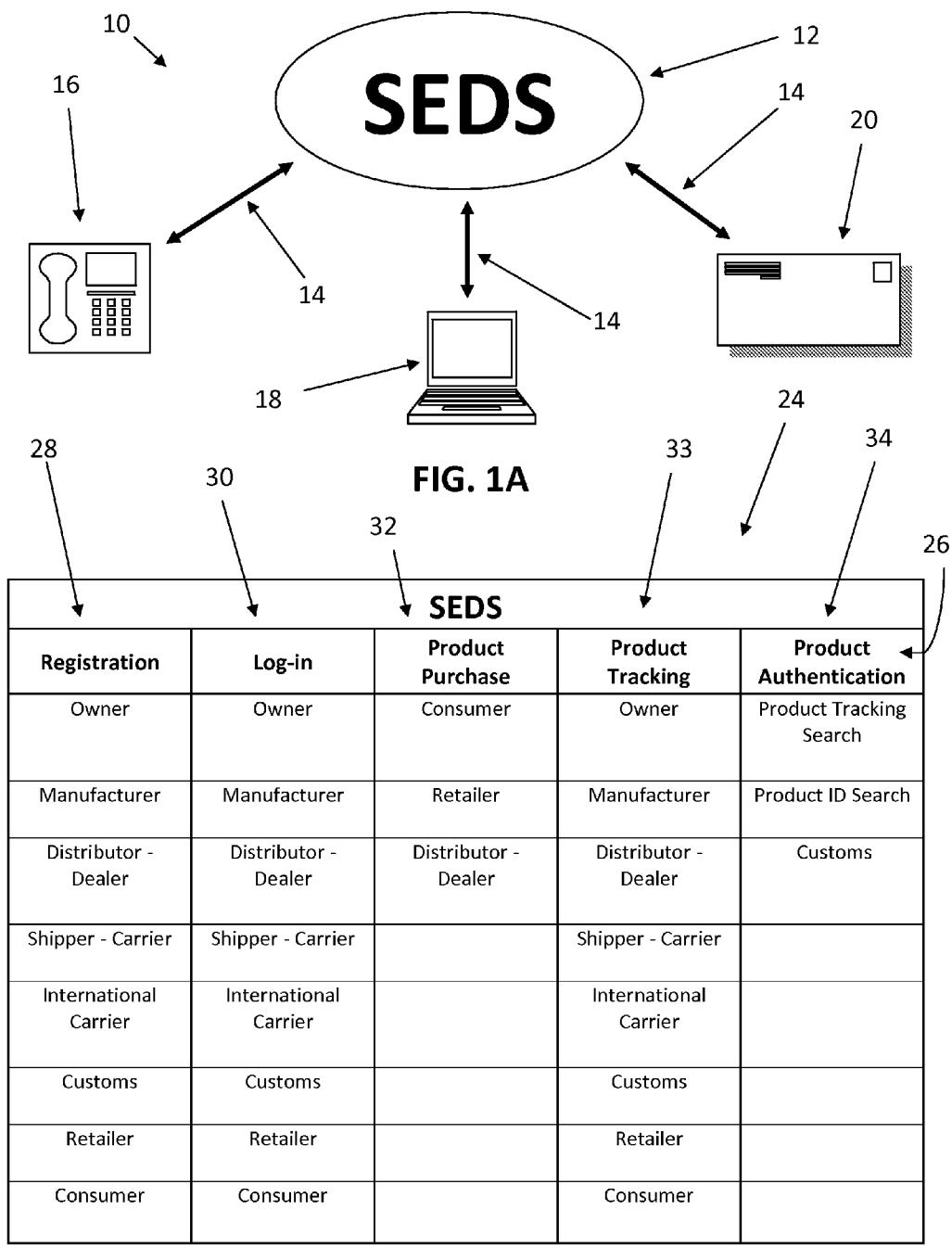
FIG. 1A is a schematic of an authentication system in accordance with an exemplary embodiment.
FIG. 1B is a schematic of an architectural structure of a search engine data server.

Referring to FIG. 1A, an exemplary embodiment of an authentication system 10 is shown. The system includes a search engine data server (hereinafter referred to as SEDS) 12 that is in communications with one or more users of the system 10, via communication links 14. The Search Engine Data Server, having the acronym (SEDS) is used for product, manufacturer and vendor certification, authentication, and verification by purchasers as a master general-purpose industrial and commercial product supply catalogue. Exemplary communications links 14 usable with the present invention include wire or wireless communications that are accessible through suitable devices such as telephones 16, computers, tablets, cell phones 18 or the like, traditional mail services 20 or otherwise. The SEDS 12 further allows various users of the systems to validate or confirm not only the authenticity of products as one in other systems, but also validates and certifies manufacturers, distributors, and retailers along a product distribution channel 22.

For example, referring to an exemplary architecture structure 24 of SEDS 12 shown in FIG. 1B, various components 26 of the SEDS 12 are shown in a row, which are accessible and/or usable by various parities of a product distribution channel 22, such as through user interfaces. It should be noted that a single entity can operate and own, SEDS 12, which can be used to monitor commercial activity for a plurality of product distribution channels 22 having multiple sets of certified manufacturers, distributors, retailers and products. SEDS 12 may comprise multiple computer servers being disposed in multiple geographic locations. Each component may comprise one or more electronic page(s) for viewing, entering product information or both. A non-exhausted listed of components 26 includes registration page(s) 28, log-in page(s) 30, product purchase page(s) 32, product tracking page(s) 33 and product authentication pages(s) 34. It should be appreciated that other pages exist as shown and described herein. As previously mentioned, it is contemplated that these components, or pages, 26 are accessible through various communications links 14, devices and methods (e.g. telephone 16, computers systems 18, mail services 20 or otherwise).

Figure 1C:
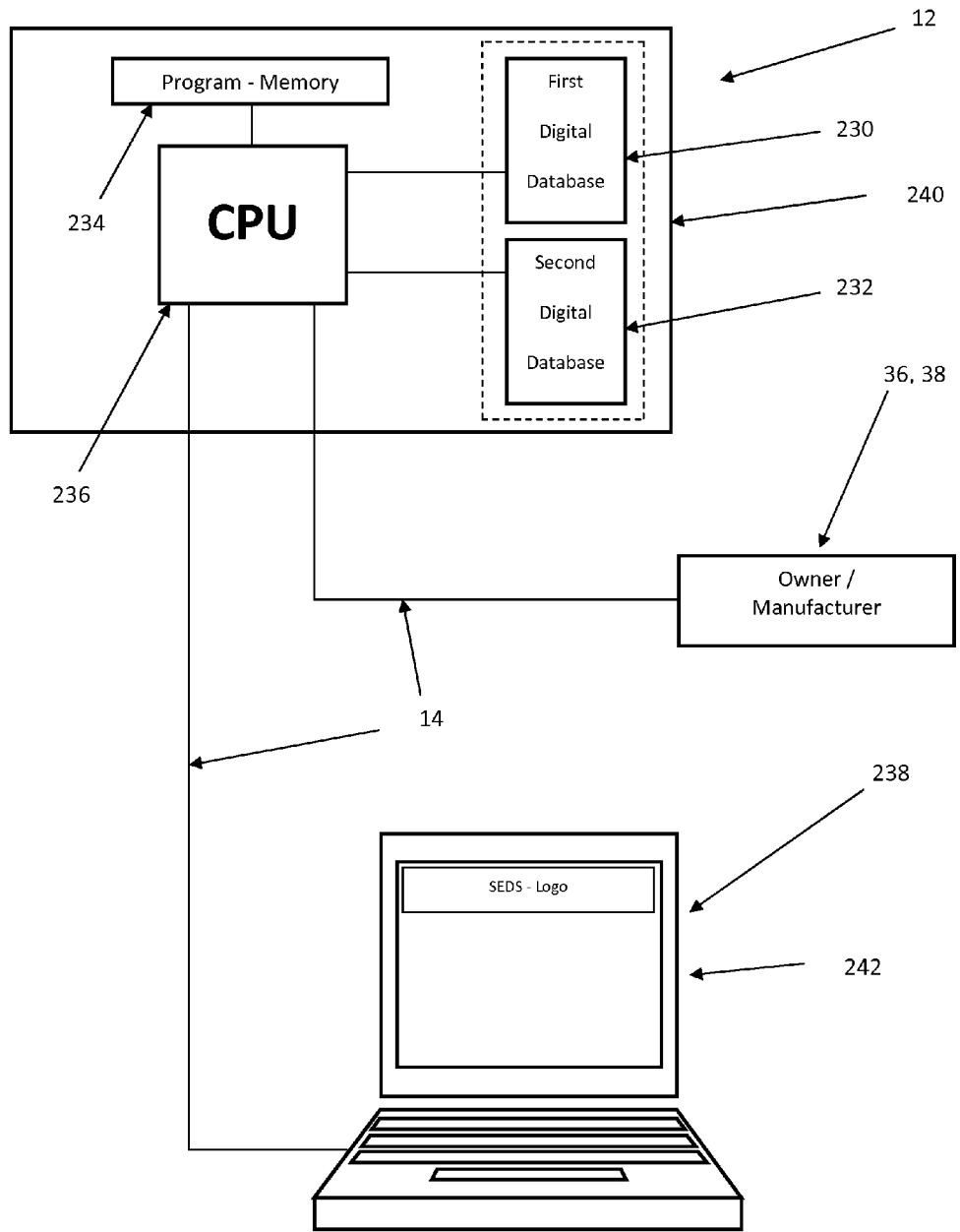
FIG. 1C is a schematic of a product authentication and alarm system.

Referring to FIG. 1C, an exemplary SEDS system 12 is shown. The system is configured to authenticate products traveling along a distribution chain. In this configuration, the SEDS system 12 is shown in communication with an owner 36 and/or manufacturer 38 for inputting product information and distribution information of one or more, or plurality, of products. Though other configurations can be arranged, the product information is stored in a first digital database 230, which may comprises a digital memory device, and the distribution information is stored in a second digital database 232, which may also comprise a digital memory device. The first digital database 230 and the second digital database 232 are stored or associated with a computer 240 having a central processing unit 236 and program memory 234, which stores instructions for generating screen windows or other pages, as shown in FIGS. 3 through 8. The computer 240 is in communications with users of the system, e.g. brand name owners 36, manufacturers 38, production facilities 40, distributors or dealers 42, shippers or carriers 44, international carriers 46, customs 48, retailers 50, consumers 52 or otherwise, via communication links 14, which utilize the user interfaces shown in FIGS. 3 through 8, or otherwise, to review, search, record information or otherwise as discussed herein.

Advantageously, the program stored on the program memory 234 provides instructions for generating user interfaces 238 on nearby or remotely located computer screens 242. The programming also includes suitable instructions for allowing users to input or review information disposed on the first digital database 230 or second digital database 232. Further, in one highly preferred embodiment, the programming includes instructions for monitoring search queries submitted by user and comparing such search queries with stored information on the first and/or second digital databases 230, 232. Should differences exists between search queries and recorded product information and distribution an alarm is generated, via the instructions disposed on the program memory, which is transmitted to the owner 36 or manufacturer 38 indicating possible counterfeit or unauthorized transactions or products within the distribution chain. Such alarms may comprise e-mails, phone calls, mail correspondence or otherwise, which may be automated. It should be appreciated that the programming on the program memory includes suitable instructions for achieving the functions of the web pages, or the user interface, shown in FIGS. 3 through 8 and as described herein.

With respect to product information stored in the first digital database 230, it is contemplated that information is suitable for distinguishing one product from another product. Contemplated product information that may be stored and searched on the first digital database 230 includes: product or supplier trademarks, bar code numbers, lot numbers, specific unique product ID numbers, or otherwise as described herein. Contemplated distribution information that may be stored and searched on the second digital database 232 includes: total production number, number of products distributed to each link of the distribution chain, e.g. distributor or dealer, shipper or carrier, retailers or otherwise, or otherwise as described herein.

Depending upon the particular configuration of SEDS 12, various users of the system 10 are or may be authorized to view and/or enter tracking data. While one configuration is particularly shown in FIG. 1A, examples of envisioned users include owners of intellectual property rights of products 36, manufacturer 38 of products, distributor or dealer 42 of products, shipper or carrier 44 of products, international carrier of products 46, customs 48 where products pass through, retailers 50 of products and consumer 52 of products. It should be appreciated that any one of these users, combinations of these users, all users or otherwise, may be granted viewing permission, tracking permission, purchasing permission or otherwise as shown or described herein.

By various latitudes manufacturers, distributors and retailers are granted viewing permission under enumerated sub-folders of Terms of Use tab 190. The owner/manufacturer 36, 38 has the widest latitude since it can view and track products to and from all distributors 42, and retailers 50 handling its products. Also, all products from production facilities 40, to respective distributors and retailers via shippers 44, and international carriers 46. Distributors 42 can view and track products to and from all retailers 50 receiving its products. Retailers 50 can view and track products only to and from retailers under the same ownership or management. They can also track the status of scheduled orders from distributors. Customs 48 can view and track everything which owner/manufacturer 36, 38 can view and track, in its respective country under the enumerated sub-folders of Official Use tab 300. Consumers 52 can view for verification: name of certified manufacturer, distributor, retailer, products and countries under tabs 154, 162, 166, 170, 172, 176 and 180.

Figure 2:
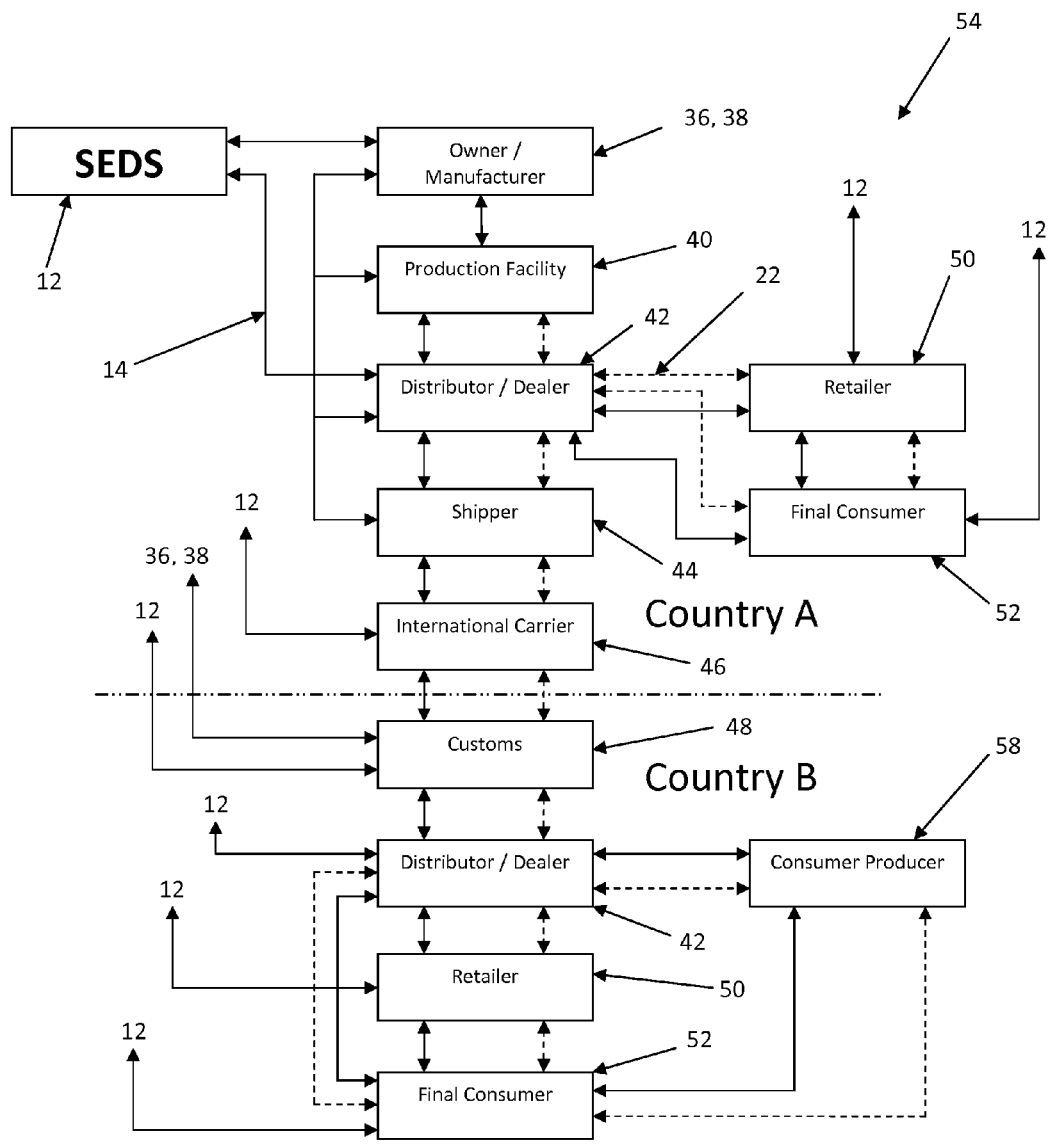
FIG. 2 is a schematic of a product distribution chain and search engine data server.

Referring to FIG. 2, an exemplary SEDS 12 distribution and communication chain 54 is shown for tracking and authenticating one or more products. In this configuration, a single-line view of a greatly simplified distribution channel for product and data flow from the owner or manufacture 36, 38, to the final consumer 52 located in a same or a different country, e.g. Country A, Country B, or otherwise, is shown. As shown, exemplary product distribution channels 22 and communications links 14 provide distribution of the products and interaction between the various users of the system 10. As previously mentioned, it should be appreciated that the communication links 14 may utilize communication links shown in FIG. 1A including telephones 16, computers or the like 18, mail services 20 or otherwise. However, in one preferred configuration communications between users of the system 10 and SEDS 12 is achieved through computers and the internet.

The main office of the manufacturer 38 and production facilities 40 can be located anywhere in the world, but is illustrated in Country A. Some ancillary items such as warehouses, for example, are omitted for simplification. The manufacturer 38 could also be a licensee of the intellectual property rights owner 36, e.g. trademark, brand-name or otherwise. It is contemplated that in one exemplary embodiment the manufacturer 38 is solely responsible for certifying and authorizing its users, e.g. distributors or dealers 42 and retailers 50, to sell its brand name products. Further, the manufacturer would also be solely responsible for enumerating a particular price range and warranty, which may be done at a particular physical address location and on a particular web site or sites. Still further, the manufacturer is also solely responsible for listing and certifying its distributors or dealers 42 and retailers 50 on SEDS 12. It is contemplated that unless certified by the manufacturer 38, distributors 42 and retailers 50 would not be listed in SEDS 12 as certified vendors.

As discussed in greater detail herein, in one configuration, before, during or after a transaction, the distribution chain information, i.e. the particular distributor 42, shipper 44, retailers 50 or otherwise, provided by the manufacturer 38, can be compared to ensure that the product is authentic. During this comparison, if there is any discrepancy between the information on file with SEDS 12 and information actually provided to the consumer, such as distributor 42, retailer 50 or otherwise, an alarm is or can be generated through SEDS 12, which will alert the manufacturer 38 or owner 36, via communication link 14, to undertake appropriate action against the non-authorized vendor of its products.

In greater detail, still referring to the SEDS distribution and communication chain 54 shown in FIG. 2, the users of the system 10 are shown connected through dashed lines representing the product distribution channel 22. The product distribution channel 22 may comprise any suitable means for movement of products from the production facility 40 to the consumer 52 including, without limitation, distribution by persons, vehicles combinations thereof or otherwise. The distribution and communication chain 54 further includes communication link 14, which is represented in solid lines, for communication between users of the system 10. The communication channel may utilize any suitable communication link 14, such as telephone 16, computer 18 and mail service 20. The communication link 14 may be configured for voice communication, digital communication, physical communications or combinations thereof.

The manufacturer's production facility or facilities 40 may be owned and controlled by the owner 36 or manufacturer 38 of the product, or an independent subcontracting production facility, either domestic or out-sourced in a different country. All the production data will be directed to the owner 36 or manufacturer 38 for posting to SEDS 12. It is believed that independent subcontracting production facilities, more so than the manufacturer-owned and controlled production facility 40, are the source of the majority of counterfeit or pirated versions of authentic products. As such, these independent subcontracting production facilities require greater supervision than owner or manufacturer owned or controlled production facility 40 for SEDS 12 to function optimally. The typical production and marketing data, passing through communication link 14, are entered into SEDS 12 by the owner or manufacture 36, 38 and consists of established standard product information, including product identification (which may be specific for each product or product type), volume of production or transfer, warranty, pricing and product registration cards and vendor data, which is generally available in both the printed and virtual catalogs. Advantageously, the use of registration cards, for the purpose of warranting the product or otherwise, serves as a check on the retailer 50 and insures that the retailer does not comingle his inventory of bona fide/authenticated products with counterfeit products that have been obtained from questionable sources. It should be appreciated that some items in the distribution and communication chain 54, such as warehouses, are omitted for simplification.

The distributor or dealer 42, in Country A, B or otherwise, may also be under the control of owner 36 or manufacturer 38, or an independent. As with independent production facilities, these independent distributors and dealers present another weak link in the distribution chain since they may stock both the bona fide products, counterfeit and pirated products, commonly referred herein as "double-dealing". Thus, while a distributor can be certified as a "trusted source" for a manufacturer A, he may not be certified for other manufacturers whose products he also carries. Some of these products could be the counterfeit versions of manufacturer 38 products. However, such "double-dealing" distributor or dealer 42 risks decertification, black-listing, domain shut down and confiscatory raid by the proper law enforcement authorities should SEDS 12 detect and the owner 36 or manufacturer 38 notify them that said distributor is trafficking in counterfeit products. The consequences of being detected conducting illegal business transactions will be a sufficient incentive for the distributor or dealer 42 not to comingle counterfeit products with bona fide ones. To remove any possibility for the distributor or dealer 42 to double-deal or to co-mingle his product line, dealers of a certified manufacturer would not be allowed by SEDS' Terms of Service contract to advertise, post or distribute products from the manufacturers who are not certified by SEDS 12. Should a dealer violate the SED's Terms of Service contract in regards to manufacturer 38, the dealer could be "black-listed" from SED'S 12 entirely, even if not in any violation of said contract in relation to other manufacturers whose products are certified.

The retailer 50 for the distributors or dealers 42, in Country A, B or otherwise, may also be under control of owner 36 or manufacturer 38, or independent. As such, independent retailer presents yet another weak link in the distribution chain since it may stock both the bona fide products, counterfeit and pirated products, referred to in this embodiment as "double-dealing". Thus, while a retailer 50 can be certified as a trusted source for an owner 36 or manufacture 38, he may or may not be certified for other manufacturers whose products he also carries. Some of these products could be the counterfeit versions of owner 36 or manufacture 38 products. Should a retailer violate the SED's Terms of Service contract in regards to owner 36 or manufacture 38, the retailer could be "black-listed" from SED'S entirely, even if not in any violation of said contract in relation to other manufacturers whose products are certified. As with distributors and dealers 42, the consequences of being detected conducting illegal business transactions will be a sufficient incentive for the retailer 50 not to comingle counterfeit products with bona fide ones. To remove any possibility for the retailer 50 to "double-deal" or to co-mingle his product line, retailer of a certified manufacturer would not be allowed by SEDS' Terms of Service contract to advertise, post or distribute products from the manufacturers and dealers who are not certified by SEDS 12. The integrity of SEDS 12 demands that the product and everyone handling the product along the distribution chain be certified as a genuine trusted source.

With continued reference to FIG. 2, the final consumer 52 in Country A purchases from SEDS 12 certified and trusted retailer 50. Under the retailer 50 are two special classes of retailers: Factory outlets and Liquidators.

The liquidators, who are the more complicated case of the two, go by various names such as inventory liquidators, merchandise liquidators, wholesale, closeouts and surplus liquidators. Specializing by industry, these retailers obtain products from numerous sources, such as manufacturers, distributors, other retailers and the general public, who are unloading their products or property due to going out of business; or experience some economic hardship such as bankruptcy; or due to fire sale; or experiencing customs or tax seizures. Both are treated by SEDS 12 the same as any other distributor or retailer. Every product is tracked back to the bona fide manufacturer of brand name owner. The liquidators and factory outlets who cannot document their products are simply not listed or certified by SEDS 12.

However, it is also possible that the final consumer 52 purchases product through the internet or otherwise, from a distributor or dealer 42, from a production facility 40, from owner 36 or manufacture 38, or even through SEDS 12. It is still further possible that the final consumer 52 purchases owner 36 or manufacture 38 product from a consumer producer 58 in another country, such as Country B. The shipper 44 in Country A transports produced goods from the production facility 40 to another chain of the distribution and communication chain 54, including to an international carrier 46 configured for international shipment of the product. It is envisioned that the shipper 44, as with other users, enters product information into SEDS 12 for tracking. The international carrier or transporter 46 transports produced goods from Country A to Country B. As with shipper 44, it is envisioned that the international carrier 46 enters product information into SEDS 12 for tracking.

As product is transported across country boarders, it is envisioned that local custom departments 48 inspect, certify and enter product information into SEDS 12. This is discussed in greater detail, herein, and in particular with reference to FIG. 6. Once the product is approved by local customs 48, the products are shipped or otherwise received by a distributor or dealer 42 of Country B, which may be under the control of owner 36, manufacturer 38, or independent. In one exemplary embodiment, SEDS 12 treats dealer 42 of both Country A and B the same. Retailer 50 of Country B receives the product from the distributor or dealer 42. As with the distributor or dealer 42, the retailer 50 may be independent and become another weak link in the product distribution chain since it may stock and retail bona fide products alongside with counterfeit and pirated ones, knowingly or unknowingly. Thus, while a retailer 50 of Country B can be certified as trusted source for owner 36, manufacturer 38, he may or may not be certified for other manufacturers and dealers whose products he also carries. Some of these products could be the counterfeit products of owner 36, manufacturer 38. However, such double-dealing retailer risks decertification, black-listing, domain shut down and confiscatory raid by the proper law enforcement authorities should SEDS 12 detect and the owner 36, manufacturer 38 notify them that said retailer 50 is trafficking in counterfeit products. The consequences of being detected conducting illegal business transactions will be a sufficiently unfavorable for the retailer 50 so as not to comingle counterfeit products with bona fide ones. To remove any incentive for the said retailer to "double-deal" or to co-mingle his product line, retailers 50 of a certified manufacturer 38 would not be allowed to advertise, post or distribute products from manufacturers or distributors who are not certified by SEDS 12. Should a retailer violate the SED's Terms of Service contract in regards to manufacturer 38, the retailer could be "black-listed" from SED'S entirely, even if not in any violation of said contract in relation to other manufacturers whose products are certified.

The final consumers 52 of Country B purchase products from retailer 50, distributor or dealer 42 and consumer-producer 58, any of which may reside in either Country A or B.

As previously mentioned SEDS 12 provides an accessible database of information pertaining to products. Accordingly, it is contemplated that SEDS 12 includes a computer, servers or series of computers and servers, configured for entry and storage of product data, as well as information pertaining to a distribution chain. Further, it is contemplated that SEDS 12 may be configured for a single product, plurality of products for a particular business or industry, or for tracking numerous product along various industries. Accordingly, it is expected that the SEDS 12 electronic components would be suitable in size and processing power to satisfy thousands, if not millions, of users simultaneously. Further, SEDS 12 is further configured to provide a user interface, as described herein or otherwise, to allow users of SEDS 12 to access information pertaining to product purchased or products that may be purchased and to any relevant vendor information. The current refinements in algorithms for the search engines and the continuous reduction in cost of computer memory, makes SEDS 12 and the authentication system 10 of the present invention ideally suited to fight product counterfeiting and other forms of intellectual property thefts through the effective product tracking across international borders in real-time.

In exemplary embodiments, SEDS 12 has the following attributes:

SEDS 12 can be accessed by customers and officials for e-commerce and product verification and authentication through a web browser anywhere in the world.

SEDS 12 can be physically located anywhere in the world and is a trusted authentication source on which consumers anywhere in the world can rely on. Since it is SEDS' Administrator's responsibility to ensure that the manufacturer is bona fide, it should be expected that manufacturer's application for the privilege of being listed on SEDS 12 will be thoroughly investigated. Once decertified by SEDS 12, manufacturers, distributors and retailers should have extreme difficulty in being re-certified.

The owners or Administrators of SEDS 12 provide a proprietary catalog inventory listings and product tracking, listing and interactive software for all registered and licensed manufacturers, distributors and retailers and their respective products, both domestic and international. This latest state of the art software is sufficiently resistant against variety of hacking and virus attacks that are designed to crash the entire system.

SEDS 12 would list and alert the manufacturer regarding phishing and malware sites posing as genuine retailers of bona fide distributors which somehow slipped past the manufacturer's scrutiny or became infected inadvertently, when such sites are reported by consumers and employees of bona fide manufacturers, distributors and retailers.

SEDS 12 being a trusted and certified source, provides incentive for various purchasing departments in both private and public sectors to adopt its listings of products, manufacturers, distributors and retailers as a form of "Certification of Quality" and require by corporate policy, ordinance or statute that all business dealings with a particular manufacturer, distributor and retailer be conducted only if the said manufacturer, distributor or retailer is certified and listed in SEDS 12. This will provide SEDS 12 with a business advantage over other listing sites to the extent that the manufacturers, distributors and retailers will gravitate towards SEDS' standards for listing and thus become reluctant to engage in any illicit transaction which could get them black-listed by SEDS 12. Over time, uncertified sites will be marginalized ensuring that consumers and general public are receiving bona fide and safe products.

SEDS 12 will provide, as part of its comprehensive service, a new, safe and virus-free web site for all its registered and licensed manufacturers, distributors and retailers to ensure that the site does not harbor malicious programs that could infect the customers' computers or legitimate-looking programs designed for fleecing the consumers. In those cases in which the registered and licensed manufacturers, distributors and retailers wish to retain their current sites, absent the ability for consumers to order products from the said sites, SEDS 12 would also verify that the sites are not already infected with viruses. At regular intervals, SEDS 12 would remotely inspect all these independently-listed sites for signs of viruses and disinfect them. If the site is made intentionally malicious by its owners or administrators, SEDS 12 would shut it down immediately. Consumer users should be confident that their computers will not become infected by malware downloads from any certified manufacturer, distributor or retailer. In addition, SEDS 12 will require that all certified products advertised on Internet be advertised only on SEDS 12 and only by certified vendors.

Since SEDS 12 has invested a great deal of capital and good will in providing reliable and authentic product information, it will reserve the right to decertify any manufacturer who is not moving aggressively against any vendor when presented with evidence from SEDS 12 and other reliable sources that such vendor is dealing in counterfeit, tainted, pirated, spelled-alike, gray-market, fenced products, on-line brand abuse and content farming. SEDS 12 will list for consumers' benefit, all known sites currently hosting illegitimate or criminal activities.

SEDS 12 is owned or administered by: (1) national government entity responsible for manufacturing and commercial interests; or (2) international entity responsible for manufacturing and commercial interests; or, (3) private entity dedicated to protection and promotion of manufacturing interests world-wide; or, (4) existing search engine entity which expands its business scope to encompass new enterprise as described by this invention; or, (5) some combination of the above indicated methods or some additional new ones.

SEDS 12 owner or Administrator should be of high ethical and business reliability due to the highly proprietary, confidential, legal and critical business data bases being administered.

All static advertisements on SEDS 12 should be from the listed and trusted manufacturers and be appropriate or relevant for the product being queried and not distract from the primary subject of listing. No pop-up ads should be allowed. The main sources of revenue to SEDS 12 owners should be from listing, certification fees and percentage of e-commerce sales.

While SEDS 12 also acts as one giant, super catalog, it does not stock or deliver any product. All transactions and orders are directed to the selected certified Manufacturer, Distributor or Retailer according to user's or customer's selection.

Further, the SEDS Administrators, as indicated above, will be the primary source to investigate and qualify the potential manufacturers and establish basic guidelines for listing only the bona fide manufacturers, distributors, and retailers in its data base, in a process referred herein as "white-listing". Also, to establish parameters for keeping known counterfeit manufacturers, distributor and retailers off the data base, in a process referred herein as "black-listing". The responsibility for investigating and qualifying distributors and retailers, and supplying relevant data to SEDS 12, falls to the certified manufacturer.

Further, no distributor and retailer can have its domain or sub domain registered to an anonymous address. All owners are fully registered per individual country's laws, and all trades are to be conducted in a transparent, traceable electronic transactions. This qualifying process will limit counterfeit and pirate sites. Should an authorized site on SEDS 12 engage in counterfeit sales or piracy, contrary to the SEDS' 12 Terms of Service, such site will be blocked immediately with proper take down notice displayed and the Customs officers raid the business establishment and confiscate the counterfeit and pirated merchandise, if any. Likewise, the owners or administrators of SEDS 12 should establish the appeal process and the criterion for moving the manufacturers, distributors and retailers from a less favorable list to the more favorable one.

Further, SEDS 12 assigns, in a process of "white listing", each certified and bona fide manufacturer 38, distributor 42 and retailer 50, an user id, profile, alpha-numeric password, domain and sub-domain, per its Terms of Use. The user will have some discretion as to the names of web sites. The certified manufacturer provides the SEDS 12 with list of its certified distributors and retailers. Initially, SEDS 12 certifies the manufacturer and assigns it in similar process an user id, profile, alpha-numeric password, domain and sub-domain, per its Terms of Use.

Further, SEDS 12 should ensure that: (A) No site which was blocked or taken down in government take down seizure, returns or continues operating by redirecting customers to its assigned website's alternative or "doppelganger" domain name using seizure workaround software. (B) The listing of bona fide products, manufacturers, distributors and retailers is current. This is done by constant querying the bona fide manufacturer for the current status of their products, distributors and retailers. (C) Its clients of manufacturers are fully alerted whenever the fraudulent data is being entered, distributed or reported by consumers, officials, other distributors, retailers and manufacturers. Also, SEDS 12 will monitor sub-domains if they mimic actual certified domains. (D) SEDS 12 verification system is a robust system, capable of weathering vigorous Denial of Service attacks from the world's hackers while ensuring that the current data residing in its numerous redundant data servers is not corrupted or destroyed by accident or internal sabotage. (E) Its programs for consumers are based on the best methods and practices of web-site design and are user-friendly to the extent that the consumers' query for an advertised product is easy and self-evident or obvious.

Figure 3:
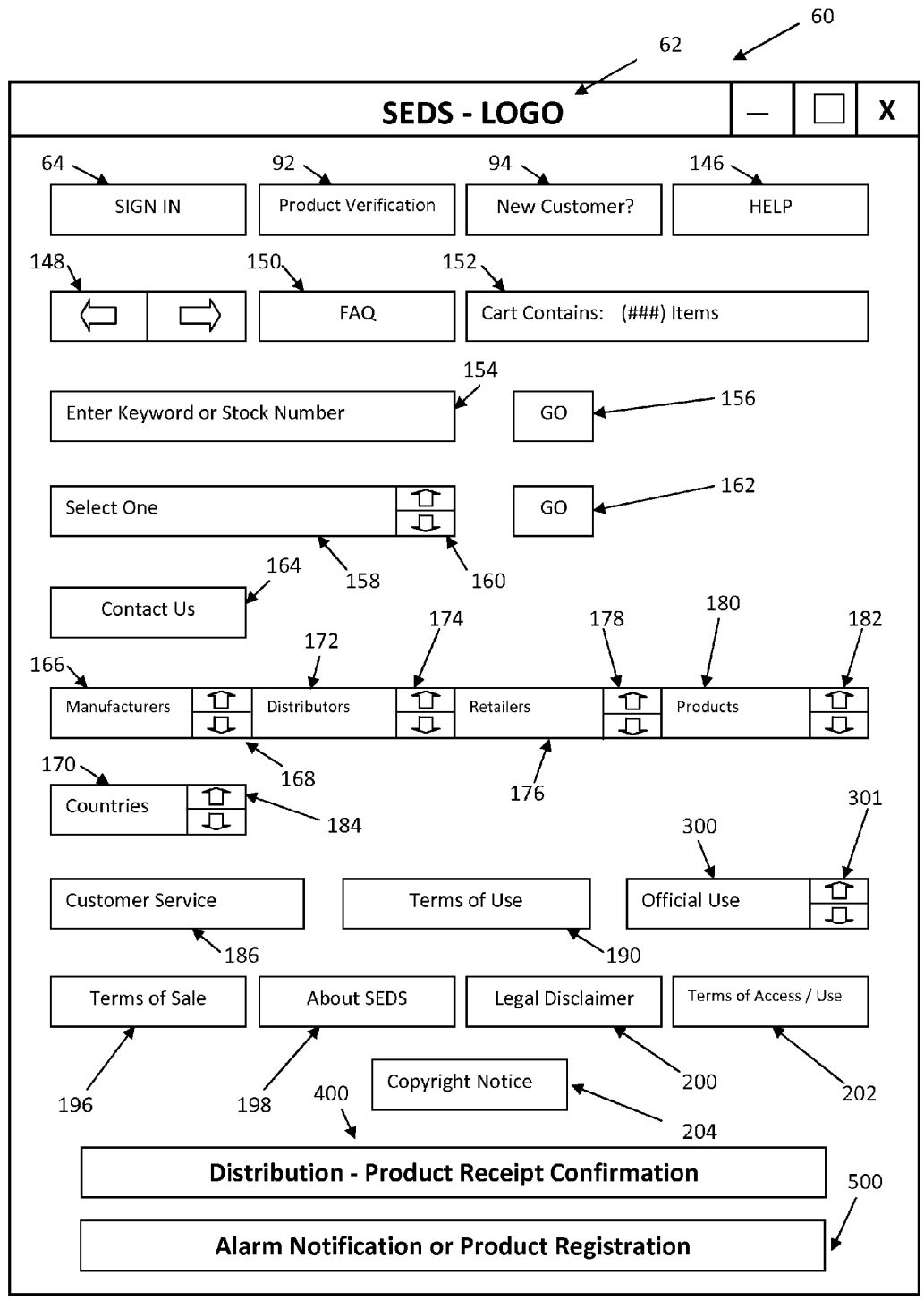
FIG. 3 is a schematic of a home page of a search engine data server.

In view of the foregoing, in one exemplary embodiment, referring to FIG. 3, a home or first web page 60 of SEDS's 12 sites where the SEDS's verification functions are listed both independently and where they are incorporated into a general purpose commercial and industrial supply and service catalog. As previously indicated since SEDS 12 can easily serve as an extensive commercial and industrial catalog in addition to the primary function as a product verification source, the home page 60 contains numerous boxes and links for both the product verification and business transactions. SEDS Administrator also determines if and how the home page 60 is modifiable by the user.

Since SEDS 12 is also a virtual, general, all-purpose certified product catalog, the home page 60, as well as other pages, are arranged in such a fashion to list both authenticated listed products, distributors, retailers and to facilitate the conduct of e-commerce business transactions for the same. Depending on the discretion of SEDS' 12 owner or administrator, the home page 60 with related links can be designed as a standard model to serve all the manufacturers, distributors and retailers with a common format or only the sizeable majority. The remaining manufacturers, distributors and retailers can design their own proprietary virtual Internet catalog home page 60 with related links, consistent with SEDS' 12 criteria. For this reason, the search functionality is installed up front. For the purpose of simplicity, the discussion regarding SEDS' 12 enormous potential for virtual industrial or commercial catalog functions will be limited here to only those Internet catalog functions most relevant to the present invention, while other less relevant functions are only mentioned informatively and without elaboration.

Referring again to the exemplary embodiment shown in FIG. 3, the home page 60 includes a logo 62, which appears at the top of the page, and potentially every other page as well. As with many internet browsers, the home page 60 includes typical features such as minimize, full page and close icons. The home page 60 further includes a sign-in tab 64 for operating SEDS 12 as a registered user and to let the user customer access his/her SEDS 12 account. FIGS. 4A and 4B provide further detail for signing in as a registered user. However, in at least one exemplary embodiment, it is not a requirement for the user to sign-in in order to simply use of SEDS 12 for verification and authentication of the product, manufacturer, distributor, retailer or to just examine SEDS' 12 master product catalogs. By hovering over the sign-in tab 64, text prompts "Sign in to your SEDS.com account to place an order and to access your personal information, previous orders and much more". This text prompt, or instruction 66, is also shown in FIG. 4A.

By clicking on the SIGN IN tab 64, the user is transferred to a sign-in web page 66, see FIG. 4A, wherein, after filling the required user ID 70 and password 72, the user clicks on the sign-in tab 74 to execute the command. By signing in the user is permitted to engage in e-commerce, after which he is automatically transferred back to the home page 60 shown in FIG. 3, for further queries. Should the user forgot his/her ID or password, they are provided the opportunity to click on the "forgot your user id" tab 76 or "forgot your password" tab 78, wherein thereafter the user is transferred to the forgotten user ID or password web page 80, see FIG. 4B. The forgotten user ID or password web page 80, shown in FIG. 4B, includes instructions 82 to enter your e-mail into e-mail box 84. The web page 80 further includes instructions 86 to open your e-mail for your user ID and password information and instructions 88 "If you cannot access your E-mail account, call SEDS' 12 customer service at 1-xxx-xxx-xxxx, 24 hours a day, 7 days a week for assistance." Also, the web page 80 includes further instructions 90 indicating 'Asterisk (*) is a required field". Upon completion, the user clicks on the continue tab 93 and is directed to the home page 60, shown in FIG. 3. Alternatively, at any time a user can return to home page 60 by clicking home tab 188.

Referring again to FIG. 3, the home page 60 further includes a product verification tab 92 which allows the user to bypass the sign-in requirement. The product verification tab 92 also records all inquiries made regarding the product by the user through cookies. This information is passed by SEDS 12 to the owner 36 or manufacturer 38. Upon clicking on the product verification tab 92, the user is free to surf other boxes and tabs within the home web page 60 but is not allowed to conduct e-commerce in SEDS 12, which requires registration.

Figure 5B:
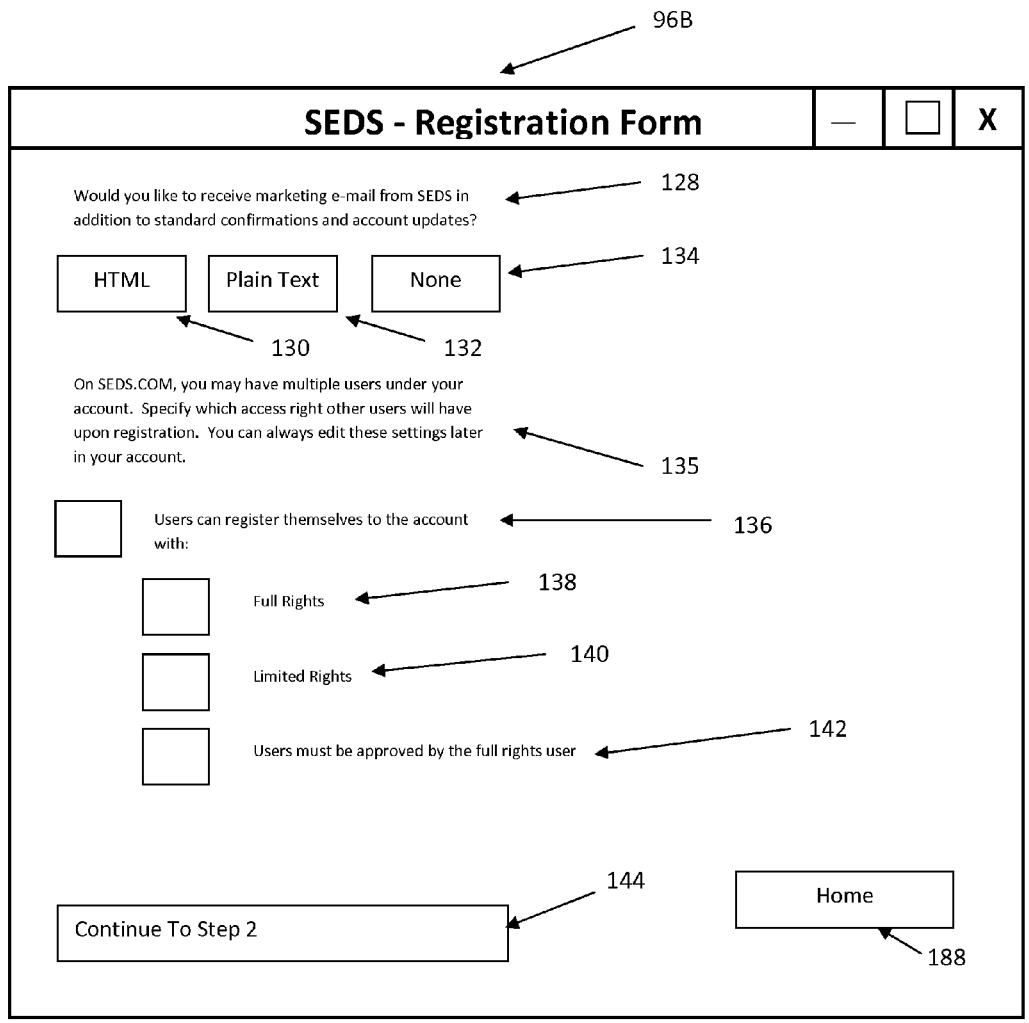
FIG. 5B is a schematic of a second registration page of a search engine data server.

The home page 60 further provides a new customer tab 94, which directs the user to SED'S registration form 96A, shown in FIGS. 5A and 5B. This box is used when the consumer elects to conduct transactions through the SEDS' 12 virtual e-commerce catalog. The registration form 96A includes instructions 98 indicating that "Asterisk (*) is a required filed". The registration form 96A requires entry of information in the first name box 100, last name box 102, and user ID box 104. The registration form further provides instructions 106 on suitable or required characters to be used in selecting a user ID. Specifically, the instructions 106 requires that: the user ID contains 6-30 characters; contain numbers; letters or space characters, such as $#@%, and not include spaces; letters can be upper or lower case; passwords are case sensitive; and cannot contain words SED or SEDS in either upper or lower case.

The registration form 96A further includes an e-mail address box 108, confirm e-mail address box 110, password box 112, confirm password box 114, security question box 116, or pre-selected security question box 118 with scroll bar 119, answer to security question box 120 and a questions 122 whether the user will be using the account for governmental purchases and further provides answer boxes YES 124 and NO 126.

In the continuation registration form 96B, shown in FIG. 5B, the form further includes instructions 128 on whether the user would like to receive marketing e-mail from SEDS 12 in addition to standard confirmations and account updates. The registration form 96B further includes boxes for selecting e-mail setting, e.g. HTML 130, plain text 132 or none 134. The registration form 96B further includes instructions 135 and corresponding account box 136 on whether the user wishes to have multiple users under the account and to specify which access right other users will have upon registration including: users can register themselves to the account 136, full rights 138 limited rights 140 and users are approved by the full rights user 142. The registration form 96B further provides a continue to step 2 box 144, which may request additional information. Such additional information could consist of credit card numbers, banking information or otherwise. At any time a user can return to home page 60 by clicking home tab 188.

Referring again to the home page 60 shown in FIG. 3, the home page further includes a help tab 146 to assists the user in managing all his/her service requests and support calls. By clicking the help tab 146 a new window is provided for selecting help on particular matters or submitting particular queries. The help tab 146 assign these requests and calls to different resources of SEDS 12 according to priority, problem type and technical skills. This helps SEDS 12 and its clients resolve problems faster such as: (a) forgetting one's user ID/changing user ID; (b) forgetting one's password/changing a password; (c) requiring a product support; (d) needing additional FAQ. In addition, the help tab 146 expedites workflows by improving communication and efficiency in regards to client and internal technical support.

The home page 60 further includes forward and back arrows 148 for traversing through different web pages of SEDS 12. These buttons may appear on every page. The home page 60 further includes a frequently asked questions (FAQ) tab 150 comprising, in part, of the following drop-down menus: a) Signing in; b) Updating My Account; c) Ordering; d) Order Status; e) Verification Process; f) Product Information; g) Registering; h) General Information; i) Technical Questions. Clicking on any one folder, drills down into sub-folders and sub-sub-folders. The home page 60 further includes a numerical indication 152 of items that have been selected for purchase. The quantity is constantly and automatically updated with every product purchased and is editable before the close of transaction.

The home page 60 further includes keyword or stock number box 154 for searching for a desired product for purchase or verification. By entering information into the keyword or stock number box 154 pertaining to the product, and clicking go tab 156, a user is allowed to search for or is provided the following items, A thru E:

A. Name of the Manufacturer. If certified and listed by SEDS 12, the name of the entered Manufacturer will appear with all the pertinent information, such as: (1) Headquarters address, relevant phone, FAX numbers, e-mail address and web site; (2) Links to its products; (3) Links to countries in which the manufacturer is doing business; (4) Links to authorized distributors, retailers, their physical addresses, phone, FAX numbers and e-mail addresses; (5) Links to web sites on which each distributor and retailer is authorized to conduct e-commerce over Internet; (6) Helpful suggestions to assist the user in making a safe selection and purchase.

B. Name of the product brand from the purported manufacturer. If the brand is bona fide and listed in SEDS 12, the following will appear with all the pertinent information, such as: (1) The manufacturer's headquarters address, relevant phone, FAX numbers, e-mail address; (2) Links to all its products; (3) Links to countries in which the indicated product brand is authorized to be sold; (4) Links to authorized distributors, retailers, their physical addresses, phone, FAX numbers and e-mail addresses, carrying the indicated product brand; (5) Links to web sites on which each distributor and retailer is authorized to do business; (6) Helpful suggestions to assist the user in making a safe selection and purchase. If any of the first five SEDS-supplied items of information above in A and B do not agree with the actual situation with the vendor offering the product, it is an indication that the particular advertised product is: (1) counterfeit; or (2) the particular vendor is not authorized by the manufacturer to sell the given product at the particular location; or (3) that the particular vendor is not certified by the manufacturer whose product is being offered for sale. This information will be relayed by SEDS 12 to the user through a text displayed on monitor.

C. Name of the Distributor who is representing himself as being authorized to carry and distribute manufacturer's brand or brands. If the distributor is listed in SEDS 12, the following will appear with all the pertinent information, such as: (1) The distributors' headquarters addresses, relevant phone, FAX numbers, e-mail address; (2) Links to all its products from authorized manufacturer or manufacturers that the dealers are authorized to distribute or sell; (3) Links to countries in which the indicated brand is authorized to be sold by a distributor in question; (4) Links to authorized retailers serviced by the said distributor, their physical addresses, phone, FAX numbers and e-mail addresses by each country; (5) Links to web sites on which each distributor and retailer is authorized to do business; (6) Helpful suggestions to assist the user in making a safe selection and purchase. If any of the first five SEDS-supplied items of information in paragraph C above do not agree with the actual situation with the distributor offering the product, it is an indication that: (a) the particular distributor is not authorized by the manufacturer to sell its product; or (b) the particular distributor is not authorized by the manufacturer to sell its product in certain location. This information will be relayed by SEDS 12 to the user through a text displayed on monitor. Since a distributor may carry numerous products from various manufacturers, he can only advertise and sell products from those manufacturers certified and approved by the manufacturer and SEDS 12.

D. Name of the Certified retailers who represent themselves as being authorized to carry and distribute manufacturer's brand or brands. If the retailer is listed in SEDS 12, the following will appear with all the pertinent information, such as: (1) The retailer's headquarters address, relevant phone, FAX numbers, e-mail address; (2) Links to all its products from authorized manufacturers and distributors that the retailer is authorized to sell; (3) Links to countries in which the indicated brand is authorized to be sold by the retailer; (4) Links to web sites on which each retailer is authorized to do business. If any of the four SEDS-supplied items of information above do not agree with the actual situation with the retailer offering the product, it is an indication that the particular product is: (a) counterfeit or; (b) the particular retailer is not authorized by the manufacturer to sell the given product at the particular location or; (c) that the particular retailer is not certified by the manufacturer to sell its products. Since a retailer may carry numerous products from various manufacturers, he can only advertise and sell products from those manufacturers certified and approved by the manufacturer and SEDS 12.

E. Name of the product or catalog stock number of the product. This displays all relevant information on the product such as price, technical specifications and diagrams and serial numbers.

Once the go tab 156 is clicked, SEDS 12 is directed to start the verification search of its data base on items A, B, C, D and E as typed into keyword or stock number box 154 and to preclude the possibility of "spelled alike" counterfeiting, whether by counterfeiting manufacturer's name or product's name. If there is a discrepancy in spelling between the user's spelling of the word or phrase based on the spelling in product advertising and the spelling provided by the manufacturer of the product to SEDS 12, SEDS 12 will prompt the user to confirm the spelling. It is possible to have a case of honest typographical error by the vendor in the spelling of the product. However, a similar misspelled product brand advertised by numerous vendors, SEDS 12 will indicate a counterfeit, with text: "No such product listed" since the SEDS' 12 algorithm will track identically misspelled product names among various vendors as provided by users making a query, and flag and generate an alarm as being counterfeit if more than one vendor advertises similarly misspelled product. This is why a confirmation of the spelling by the manufacturer is necessary. If there is no discrepancy in spelling, SEDS 12 will indicate by text that no discrepancy has been found based on the word or a phrase submitted by the user and that the user is advised to use other search buttons or links for a confirmation, if further confirmation is wanted.

The home web page 60 further includes a select one box 158 having a scroll bar 160 and an associated go tab 162 for directing action by SEDS 12. The scroll bar 160 scrolls and displays: (a) Telephone area code; (b) Mail code or ZIP; (c) Region; (d) Country; (e) State or Province; (f) City or locality; (g) Retailer; (h) Distributor; and (i) Manufacturer. By clicking on any one display, MANUFACTURER for example, a blank field is provided for the user to fill with the name of the manufacturer. Upon filling the blank field and clicking on the go tab 162, SEDS 12 displays all the information pertaining to the entered manufacturer information. If the entered manufacturer's name is not in SEDS 12 records, or not registered under the name provided by user, it will indicate by text message appropriately. While similar to keyword or stock number box 154, the select one box 158 is primarily intended for the user to make product verification.

The home web page 60 further includes a contact us tab 164 with standardized fields which includes integrated anti-spam capabilities, allowing user to communicate with SEDS 12 regarding business transaction issues, detected piracy or counterfeit issues or verification of products and vendors. This information is routinely shared by SEDS 12 with the affected manufacturer or the manufacturers if information is of common concern. Clicking on e-mail us option, within the contact us tab 164, the tab is expanded and additional folders are provided. These folders, as partially listed below, assist the SEDS 12 to operate as a comprehensive, and diverse industrial supply catalog. The contact us tab 164 further provides the ability to request generic information including: (A) ABOUT US; (B) BULK ORDER FORM; (C) CATALOG REQUEST; (D) COMPANY INFORMATION; (E) CAREERS with SEDS; (F) SEDS' COMMUNITY, PRESS and INVESTOR RELATIONS; (G) CUSTOMER ORDER STATUS and SUPPORT; (H) ORDER HISTORY; (I) RETURNS; (J) SITE FEATURES; (K) WILL CALL; (L) WORLDWIDE SUPPLIER OVERVIEW; (M) CLEARANCE and REBATES DEPARTMENT; (N) TODAY'S SPECIALS; (O) SEDS' WEB SEMINARS; (P) ON-LINE PURCHASING SOLUTIONS; (Q) SEDS' NEWSLETTER; (R) DISCLAIMERS; (S) CROSS-REFERENCE INFORMATION; (T) HOT BUYS; (U) EMERGENCY SERVICES; and (V) OTHERS.

The home web page 60 further includes a manufactures tab 166 which provides a list of certified manufacturers who are SEDS-listed and appear in an alphabetical order. The manufacture's tab 166 includes a scroll bar 168 for selecting a particular manufacturer and a list of countries where it has representation, along with the country of origin is displayed or otherwise. This is similar to entering the name of a manufacturer in the keyword or stock number box 154. Alternatively, the name of the certified manufacturer may also be obtained by clicking on the countries tab 170. There should be no inconsistency in data derived from manufactures tab 166 and information obtained from the keyword or stock number box 154 and countries tab 170.

The home web page 60 further includes a distributors tab 172, which provides a list of all the certified distributors or dealers who are listed and appear in an alphabetical order. The distributors tab 172 includes a scroll bar 174 for selecting a particular distributor and the countries where it has representation, along with the country of origin is displayed. This is similar to entering the name of a distributor in the keyword or stock number box 154. The name of the certified distributor may also be obtained by clicking on the countries tab 170. There should be no inconsistency in data derived from the distributors tab 172 and information obtained from the keyword or stock number box 154 and countries tab 168. If the distributor has its own catalog, user or customer may view such catalog but would not be able to purchase directly from the distributor without going through SEDS 12.

The home web page 60 further includes a retailers tab 176 which provides a list of all the certified retailers in an alphabetical order. The retailer's tab 167 includes a scroll bar 178 for selecting a particular retailer and countries where it has representation, along with the country of origin is displayed. This is similar to entering the name of a retailer in keyword or stock number box 154. If the retailer has its own catalog, user or customer may view such catalog but would not be able to purchase directly from the retailer without going through SEDS 12.

The home web page 60 further includes a products tab 180, which provides a list of all the certified genuine products as sold from the vendors which are all certified as bona fide. The products tab 180 includes a scroll bar 182 for selecting a particular product. The SEDS' master catalog mirrors the individual catalogs of certified distributors and retailers. Some of the product catalog for example, listed alphabetically by industry in SEDS 12, are: (a) Electrical; (b) Electronics, civilian and military; (c) Manufacturing; (d) Pharmaceutical; (e) Chemical; (f) Transportation, land, air sea; (g) Raw materials; (h) Power transmission; etc. By scrolling and clicking on a particular product category a user is able to find detailed information on the specific product listed in the various sub-categories, their certified manufacturers, distributors and retailers as they are listed by countries.

The products tab 180 includes information dealing with particulars of ordering products, quantities, pricing, delivery dates, methods of payment and other transactional details. Examples of similar arrangements can be found at www.grainger.com. Such information may be similarly placed in other search tabs shown or described with reference to home web page 60 or other web page.

In greater detail, with respect to countries, by clicking on the countries tab 170, all the certified distributors and retailers are listed in an alphabetical order under the manufacturer, by country, also in the alphabetical order. Names of localities where the distributors and retailers market their certified products by other certified manufacturers, they would be listed accordingly. The countries tab 170 includes scroll bar 184 for clicking on a particular country, the cities or localities where the manufacturer has certified representation is displayed. While this is a redundant link which is similar to clicking on the keyword or number box 154 and the distributor tab 172 and retailer tab 176, it is necessary where the user is mainly interested in verifying the certified manufacturer, distributor or retailer in a specific country.

The home web page 60 further includes a customer service tab 186, which is more order-specific than the general information provided in the contact us tab 164 and provides additional links to: (a) Order status; (b) General questions; (c) Web site support; (d) Product support; (e) Help with SEDS accounts; Billing issues; (f) New SEDS features; Lost password; (g) Map and driving directions to nearest Manufacturer, Distributor or Retailer; and (h) Information for manufacturer, distributors, and retailers on becoming SEDS certified.

The home web page 60 further includes: a) a terms of use tab 190 which provides additional information in sub-folders; and b) an official use only tab 300 which is intended mainly for Customs. The folders in the official use only tab 300 are not accessible to other SEDS 12 users such as customers, distributors and retailers. The information on the official use only tab 300 is in the 'pdf' format and available also to the manufacturer, since it is the manufacturer who provides such information to the Customs at the same time as it is provided to SEDS 12. The official use tab 300 includes a scroll bar 301 and allows customs to be able to: Sign into SEDS 12; verify customer ID number; verify carrier number; verify shipper's number; verify Bill of Lading (.pdf); verify the Multi-Modal Transport Documents and any other required document. By comparing the product manifest and other accompanied import documents with the product document on SEDS 12, customs would be able to verify the authenticity of the shipment. Should the customs discover contraband item secreted among or within the product, it would be much easier to narrow the search for the source of contraband, down to production shift and hour.

The home web page 60 further includes a terms of sale, license agreements and policies tab 196 with a model language binding on SEDS 12 and all manufacturers, distributors and retailers doing business through SEDS 12, with respect to: a) Terms and Conditions of Sale folder, with a model language, b) View Service contract folder, with a model language, c) warranties folder, with a model language, d) return Policy folder, with a model language.

The home web page 60 further includes an about SEDS tab 198, with model language, for describing attributes of SEDS 12.

The home web page 60 further includes a legal disclaimer tab 200 with international and national recognized consumer regulations covering the sections below and binding on SEDS 12 and all manufacturers, distributors and retailers doing business through SEDS 12. The legal disclaimer tab 200 supplements other SEDS tabs with: (A) PRIVACY POLICY folder, with a model language. (1) ABOUT SEDS ADS and E-MAILS sub-folder, with a model language. (2) MAILING LIST REMOVAL/CHANGE of ADDRESS sub-folder, with a model language. (3) HOW SEDS and OUR MANUFACTURERS, DISTRIBUTORS and RETAIL PARTNERS USE COOKIES and WEB BEACONS sub-folder, with a model language. (B) COPYRIGHT sub-folder, with a model language. (C) SEDS' PATENTS IN FORCE sub-folder, listing SEDS' patents. (D) PIRACY STATEMENT sub-folder, with a model language. (E) GLOBAL SOCIAL MEDIA POLICY sub-folder, with a model language. (F) ENCRYPTION sub-folder, with a model language. (G) SEDS' SUBMISSIONS POLICY sub-folder, with possible model language: "All remarks, suggestions, ideas, graphics or other information communicated to SEDS 12 through this Site will forever be the property of SEDS 12. Unless otherwise specified in writing, all material submitted to SEDS 12 will be presumed to be public and SEDS 12 will not be required to treat the information as confidential. SEDS 12 shall have exclusive ownership of all present and future existing rights in the information, without compensation to the person sending the information".

The home web page 60 further includes a terms of access and use tab 202 with possible model language: "Access to this Web site is limited to viewing the linked Web pages solely for legitimate business purposes to access the information provided by SEDS at this Web site. Any access or attempt to access other areas of the SEDS computer system or other information contained on the system for any purposes is strictly prohibited. You may not use any information contained on this Web site other than in connection with a legitimate business purpose".

The home web page 60 further includes a copyright notice tab 204, which describes rights asserted by the system 10, owners 36, manufacturers 38 or otherwise.

Figure 6:
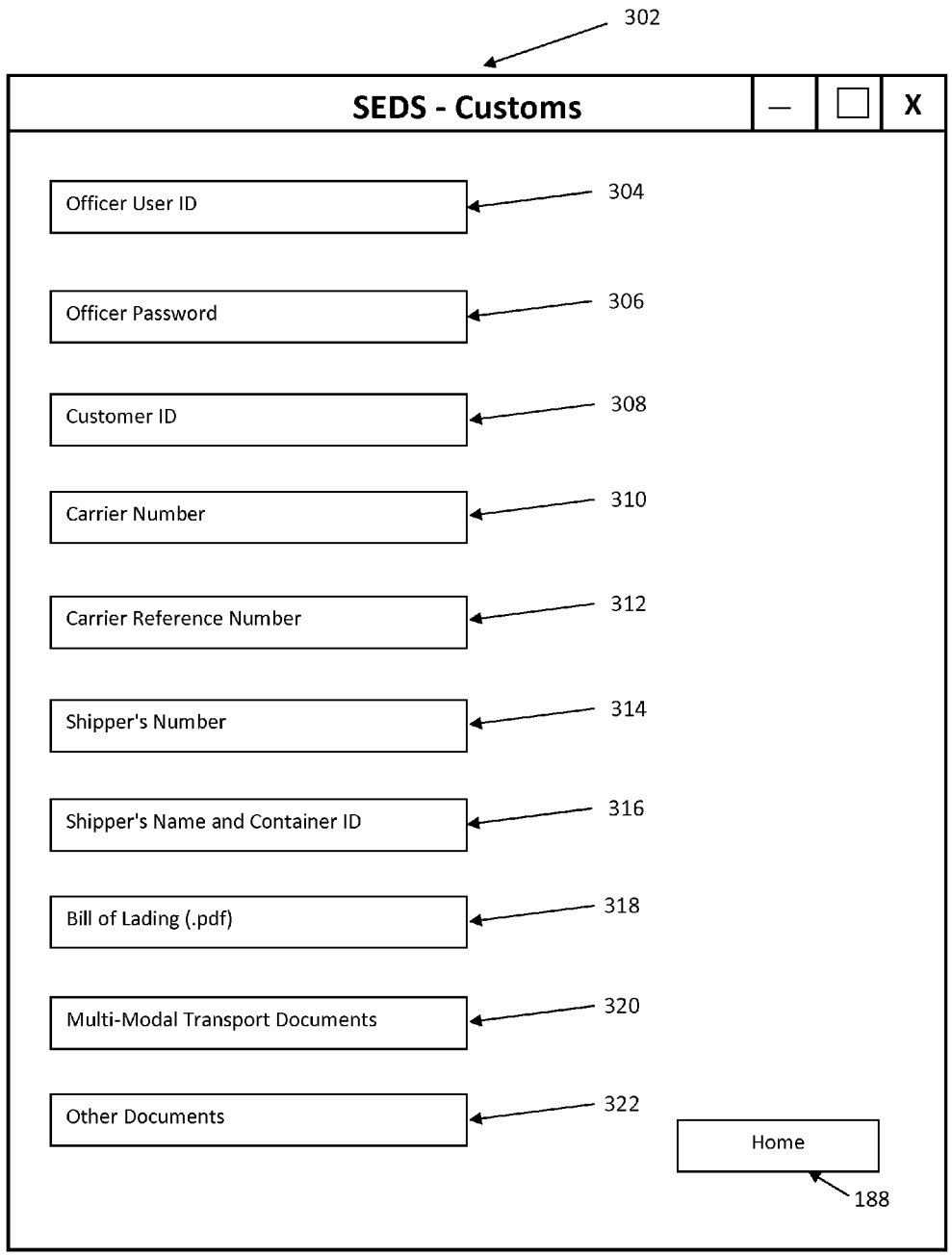
FIG. 6 is a schematic of a customs page of a search engine data server.
Figure 8:
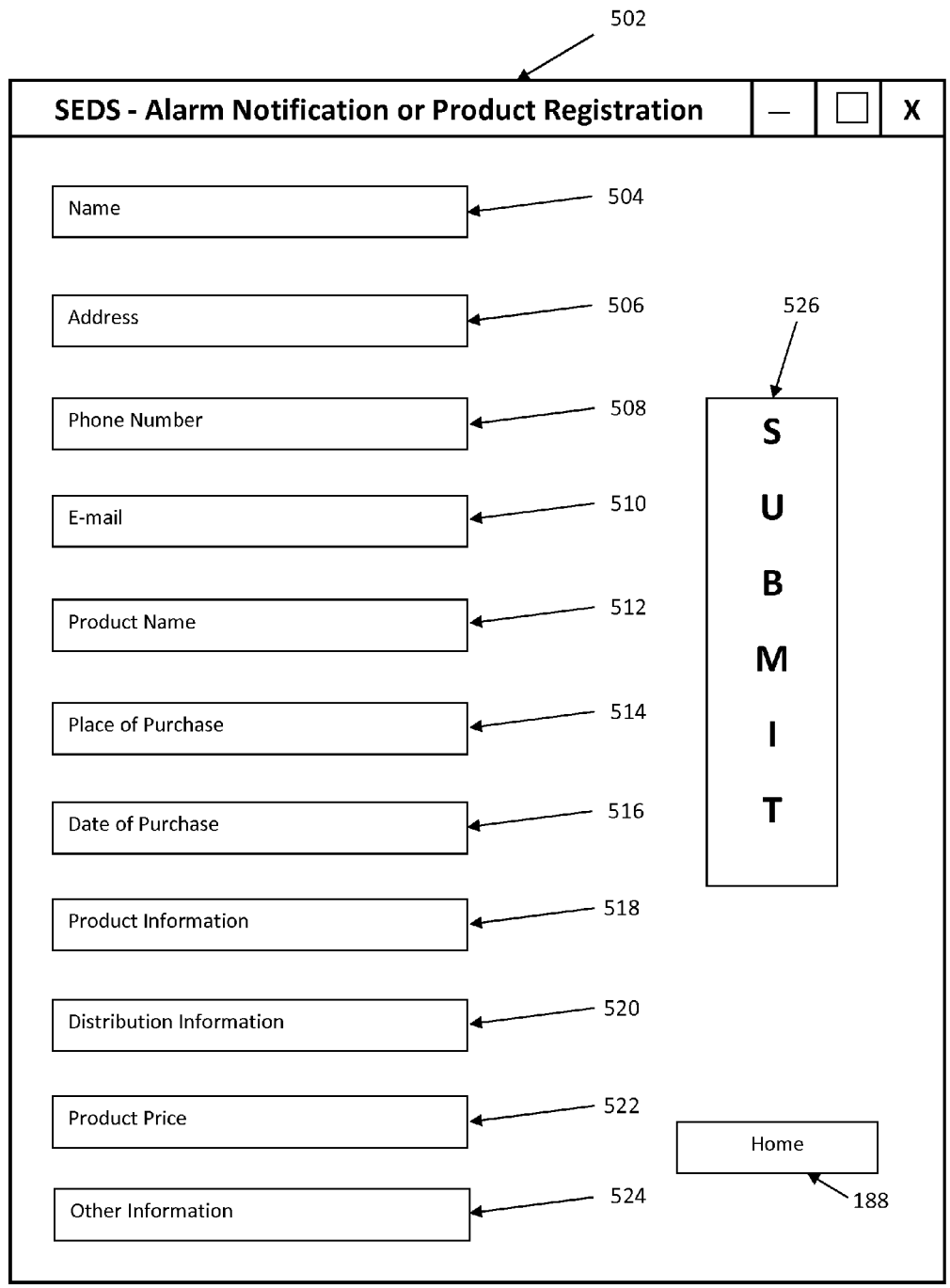
FIG. 8 is a schematic of an alarm notification or product registration page of a search engine data server.

In greater detail, with respect to the official use only tab 300 shown in FIG. 3, in one exemplary embodiment upon clicking the tab the customs agent is directed to a customs web page 302. Referring to FIG. 6, the customs web page 302 provides the ability for custom agents to enter into SEDS 12 information pertaining to the product. Upon arriving at the customs web page 302, the custom agent logs in by entering information into an officer user ID box 304 and officer password box 306. The custom agent then enters other information pertaining to the shipment of the product. For example, the customs agent can enter information into customer ID box 308, carrier number box 310, carrier reference number box 312, shipper's number box 314, shipper's name and container ID box 316, bill of lading (.pdf) box 318, multi-modal transport documents box 320, or other documents box 322. At any time a user can return to home page 60 by clicking home tab 188. Any discrepancy between information provided by SEDS 12 and documents with shipment should raise the alert flag with customs officer.

As previously mentioned, the authentication system 10 allows various users to enter information pertaining to distribution of products along a distribution chain. Referring again to FIG. 3, the SEDS home web page 60 includes a distribution—product receipt confirmation tab 400 for providing users, particularly parties along the distribution chain the ability to input product information of received products. Upon clicking the confirmation tab 400, the user is directed towards the product receipt confirmation web page 402. Through this page the user can input receipt information of products including the product quantity, trademarks, where the product came from (i.e. the link above the user in the distribution chain) any identification of the product including lot numbers, unique ID numbers, or otherwise as described herein. Should the information be different than what was inputted and authorized by the owner 36 and manufacturer 38, an alarm is generated as described with respect to FIG. 1C. This puts the owner 36 or manufacturer 38 on notice that an anomaly has occurred indicating potentially that a counterfeit or other unauthorized product has entered the distribution chain.

In greater detail, with respect to the product receipt confirmation web page 402 shown in FIG. 7, the user enters information into boxes pertaining to receipt of product. This information is entered into: distribution chain member name box 404, address box 406, phone number box 408, e-mail box 410, product name box 412, product ID(s) or lot numbers box 414, shipping party box 416, receipt date box 418, quantity box 420, other information box 422. It should be appreciated that other information boxes may be used. Upon completion, the user clicks the submit box 424 which causes the information to be submitted to SEDS 12 and analyzed by SEDS programming, as described herein, for potential anomalies. Upon completion, or prior to completion, the user can return to the home web page 60 by clicking home tab 188.

As mentioned herein, SEDS 12 monitors queries sent by purchasers of the products and information submitted by participants along the distribution chain. In one exemplary embodiment, referring again to FIG. 3, SEDS 12 also provides the ability of consumers to manually transmit alarms to SEDS 12, which may be directed or relayed to owners 36 and manufacturers 38, indicating that they know or believe that the product they purchased or are about to purchase is counterfeit or at a minimum unauthorized for sale. Also, SEDS 12 provides the ability for a user to register a purchased product.

With respect to these advantageous, in one configuration, the home page 60 provides an alarm notification or product registration tab 500. The alarm notification or product registration tab 500 directs a user to an alarm notification or product registration web page 502, in FIG. 8, which as with the distribution—product receipt confirmation page 402, allows a user to enter in information pertaining to a particular product and more particularly a product that has been purchased or about to be purchased. The alarm notification or product registration web page 502 includes the following boxes in which information can be entered and submitted to SEDS 12: purchasers name box 504, address box 506, phone number box 508, e-mail box 510, product name box 512, place of purchase box 514, date of purchase box 516, product information box 518, distribution information box 520, product price box 522, other information box 524 or otherwise. Upon completion, the user clicks the submit box 526 which causes the information to be submitted to SEDS 12 and analyzed by SEDS programming, as described herein, for potential anomalies or for transmitting an appropriate alarm to the owner 36 or manufacturer 38. Upon completion, or prior to completion, the user can return to the home web page 60 by clicking home tab 188.

In one exemplary embodiment, referring to FIGS. 9A and 9B and in view of the forgoing, the present invention further includes a product authentication process for a distribution chain 228. In general, referring to FIG. 9a, the owner 36 and/or manufacturer 38 provides a product along a distribution chain 228 through a plurality of links, Link A, Link B, etc. Such links may comprise any of a distribution chain, as discussed herein or otherwise, such as distributor or dealer 42, shipper or carrier 44, customs 48, retailers 50 or otherwise, which distributes products that are eventually consumed by consumer 52. Prior to distribution, the owner 36 and/or manufacture 38 enters product information into SEDS 12 including distribution amount, ID numbers or references for lots or specific products and other information as described therein or otherwise. As the various links receives product they enter in information into SEDS 12 pertaining to the product that is received, including number of products received, ID numbers or references for lots or specific products or other information. Similarly, once the product is received by the consumer 52, the consumer registers or confirms authenticity of the product through warranty cards and other means. Any anomaly along the distribution chain 228 or consumer 52 and SEDS 12 generates an alarm that is received by the owner 36 or manufacturer 38.

Referring to FIG. 9B, a flow chart of the process of FIG. 9A is shown. As shown, the process includes manufacture of a product. Information of the product is entered into SEDS 12, such as distribution amount, ID numbers or references for lots or specific products and other information whereas the information provided by owner 36 or manufacturer 38 to SEDS 12 is treated by SEDS 12 as a "master data" against which all other data from the outside world is compared by SEDS 12. The products are distributed along the distribution chain 228, wherein at each link the information pertaining to the product is entered into SEDS. If SEDS 12 determines an anomaly exists between product number received, shipped, ID numbers or references for lots or specific products and other information, then an alarm is generated that is received by the owner 36 or manufacturer 38. This process is repeated down the entire distribution chain 228 until the product reaches the consumer 52. The consumer then has not only the ability, but is enticed, through warranty, packaging, trademarks, rebates, or otherwise, to log into SEDS 12 and verify the authenticity of the product. Again, if SEDS 12 determines an anomaly exists between product number received, shipped, ID numbers or references for lots or specific products and other information, then an alarm is generated that is received by the owner 36 or manufacturer 38. It should be appreciated that more or fewer steps may be involved.

Figure 10:
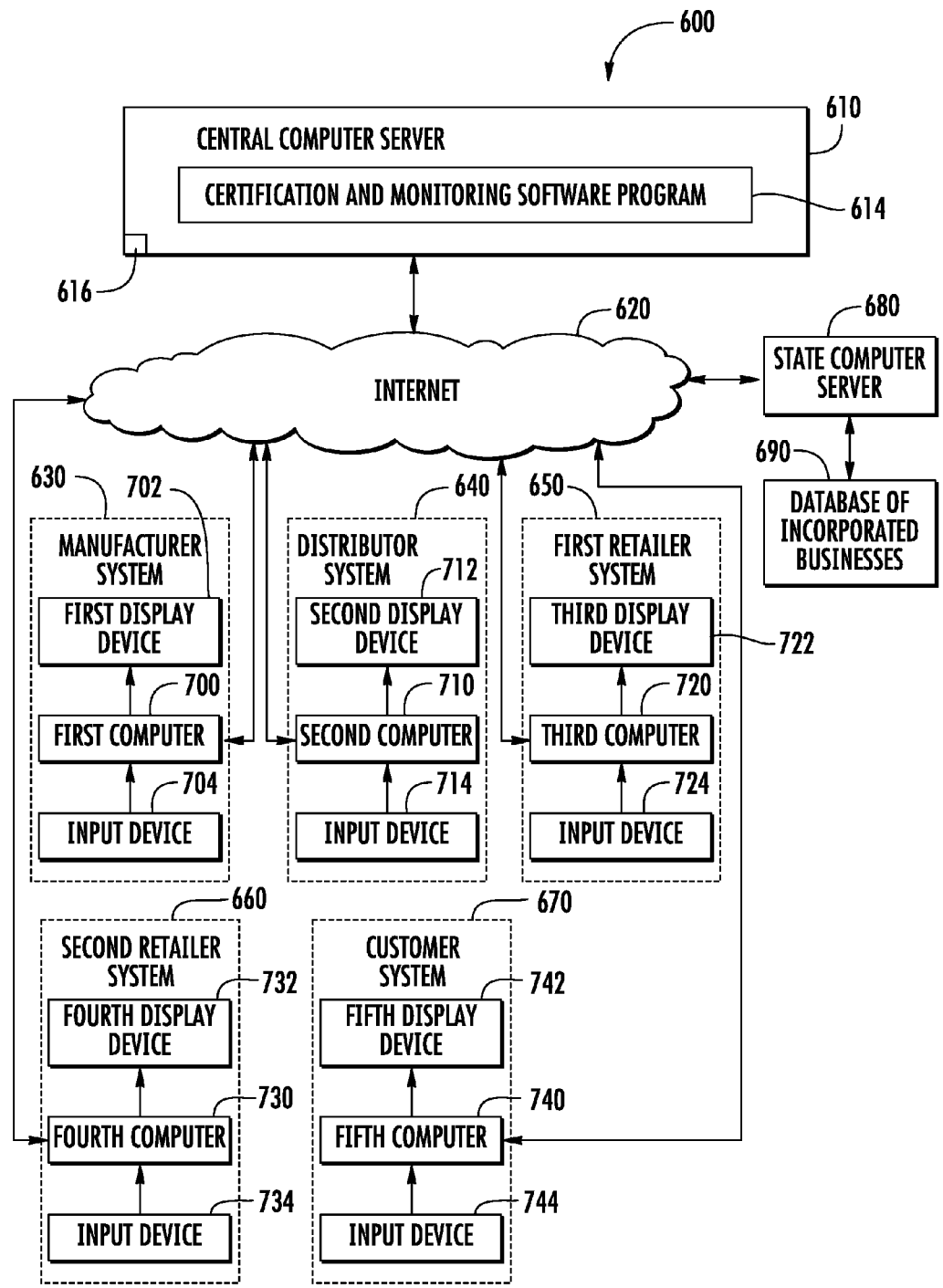
FIG. 10 is a schematic of a system for certifying and monitoring commercial activity of a manufacturer, distributors, and retailers in a product supply chain, in accordance with another exemplary embodiment.

Referring to FIG. 10, a system 10 for certifying and monitoring commercial activity of a manufacturer, a distributor, and retailers in a product supply chain in accordance with another exemplary embodiment is provided. The system 10 includes a central computer server 610, the Internet 620, a manufacturer system 630, a distributor system 640, a first retailer system 650, a second retailer system 660, a customer system 670, a state computer server 680, and a database 690. An advantage of the system 10 is that the system 10 verifies that the manufacturer is registered with an identified state of incorporation. Thereafter, the system 10 allows the manufacturer to select and certify a distributor and retailers who will receive products manufactured by the manufacturer in a product supply chain. Thereafter, the manufacturer, the distributor, and the retailers enter product shipment information which is monitored by the system 10, and the system 10 generates notification messages for the manufacture if the distributor is shipping out more of the product and was received by the manufacturer during a predetermined time period (e.g., 60 day time period or 90 day time period), or the retailers are selling more of the product than was received from the distributor during the predetermined time. For purposes of understanding, a state of incorporation means at least one of a state of a republic (e.g., Michigan), a province (e.g., Ontario), or a country (e.g., Canada).

Referring to FIGS. 10-22, the central computer server 610 is owned and managed by a certification and monitoring company. The central computer server 610 includes a certification and monitoring software program 614 stored in a memory 616. The certification and monitoring software program 614 is programmed to generate a login web page 770 (shown in FIG. 11), a manufacturer registration web page 800 (shown in FIG. 12), a manufacturer selection web page 830 (shown in FIG. 13), a product web page 860 (shown in FIG. 14), a select distributor web page 890 (shown in FIG. 15), a select retailer web page 920 (shown in FIG. 16), a manufacturer shipment web page 950 (shown in FIG. 17), a distributor shipment web page 1030 (shown in FIG. 20), a retailer web page 1060 (shown in FIG. 21), a product authentication web page 1090 (shown in FIG. 22), a notification web page 980 (shown in FIG. 18), and a de-certification web page 1010 (shown in FIG. 19). The central computer server 610 operably communicates with the Internet 620 to transmit and receive data through the Internet 620 with the manufacturer system 630, the distributor system 640, the first retailer system 650, the second retailer system 660, the customer system 670, and the state computer server 680.

Manufacturer

The manufacturer system 630 is owned and operated by a registered and certified manufacturer. The manufacturer system 630 includes a first computer 700, a first display device 702, and an input device 704. The first display device 780 and the input device 704 are operably coupled of the first computer 700. In an exemplary embodiment, the input device 704 is at least one of a computer keyboard and a computer mouse.

Login Web Page

Referring to FIGS. 10 and 11, when the manufacturer accesses the certification of monitoring software program 614 utilizing the first computer 700, the first computer 700 induces (by generating a control signal) the first display device 702 to display the login web page 770. The login web page 770 includes a manufacturer login checkbox 722, a distributor login checkbox 774, a retailer login checkbox 776, an authenticate product checkbox 778, a user name text box 780, a password text box 782, and a login command button 784.

The certification monitoring software program 614 allows a manufacturer to login to the central computer server 610 by performing the following steps: (1) selecting the manufacture login checkbox 722 utilizing the input device 704, (2) inputting a valid user name in the user name text box 780 utilizing input device 704, (3) inputting a valid password in the password text box 782 utilizing the input device 704, and (4) selecting the login command button 784 utilizing the input device 704.

Further, after the manufacturer inputs the data within the text boxes 780, 782 and selects the checkbox 772 and the login command button 784, the data within the text boxes 780, 782 is transferred through the Internet 620 to the central computer server 610. The certification monitoring software program 614 determines whether the manufacturer has entered a user name and password that correspond to a stored user name and password, respectively, and logs the manufacturer into the central computer server 610 if the user name and password correspond to the stored user name and password, respectively.

Manufacturer Registration Web Page

Referring to FIGS. 10 and 12, after the manufacturer logs into the central computer server 610, the first computer 700 induces the first display device 702 to display the manufacturer registration web page 800 (shown in FIG. 12). The manufacturer registration web page 800 is provided to allow the manufacturer to register with the central computer server 610. The manufacturer registration web page 800 includes: a manufacturer name text box 802, an address text box 804, a telephone number text box 806, a state of incorporation text box 808, an email address text box 810, a contact person text box 812, a submit command button 814, and an exit command button 816. The manufacturer can request to become registered with the central computer server 610 by performing the following steps: (1) inputting a manufacturer name in the manufacturer text box 802 utilizing the input device 704, (2) inputting an address of the manufacturer in the address text box 804 utilizing the input device 704, (3) inputting a telephone number of the manufacturer in the telephone number text box 806 utilizing the input device 704, (4) inputting a state of incorporation of the manufacturer in the state of incorporation text box 808 utilizing the input device 704, (5) inputting an email address in the email address text box 810 utilizing the input device 704, (6) inputting a contact person name in the contact person text box 812 utilizing the input device 704, (7) and selecting the submit command button 814 utilizing the input device 704.

Further, after the manufacturer inputs the data within the text boxes 802-812 and selects the submit command button 814, the data within the text boxes 802-812 is transferred through the Internet 620 to the central computer server 610. The certification monitoring software program 614 stores the received data within the memory 616. Also, the program 614 induces the central computer server 610 to query the state computer server 680 via the Internet 620 utilizing the data within the text boxes 802, 804, 808 to determine whether the manufacturer name is registered in the state of incorporation. In particular, the state computer server 680 accesses the database of incorporated businesses 690 to determine whether the manufacturer name, address, and state of incorporation received from the central computer server 610 for the manufacturer corresponds to information for a registered company within the database 690.

If the manufacturer does not correspond to a legally-registered company, the state computer server 680 transmits a non-verification message through the Internet 620 to the central computer server 610 indicating that the manufacturer is not registered within the listed state of incorporation and is therefore not a registered business with the listed state. Thereafter, the first computer 700 induces the first display device 702 to display the login web page 770 (shown in FIG. 11).

If the manufacturer corresponds to a registered company, the state computer server 680 transmits a verification message through the Internet 620 to the central computer server 610 indicating that the manufacturer is registered within the listed state of incorporation and is therefore a registered business with the listed state. Thereafter, the first computer 700 induces the first display device 702 to display the manufacturer selection web page 830 (shown in FIG. 13).

If the manufacturer selects the exit command button 816 utilizing the input device 704, the first computer 700 induces the first display device 702 to display the login web page 770 (shown in FIG. 10 and none of the data inputted in the text boxes 802-812 is saved.

Manufacturer Selection Web Page

Figure 13:
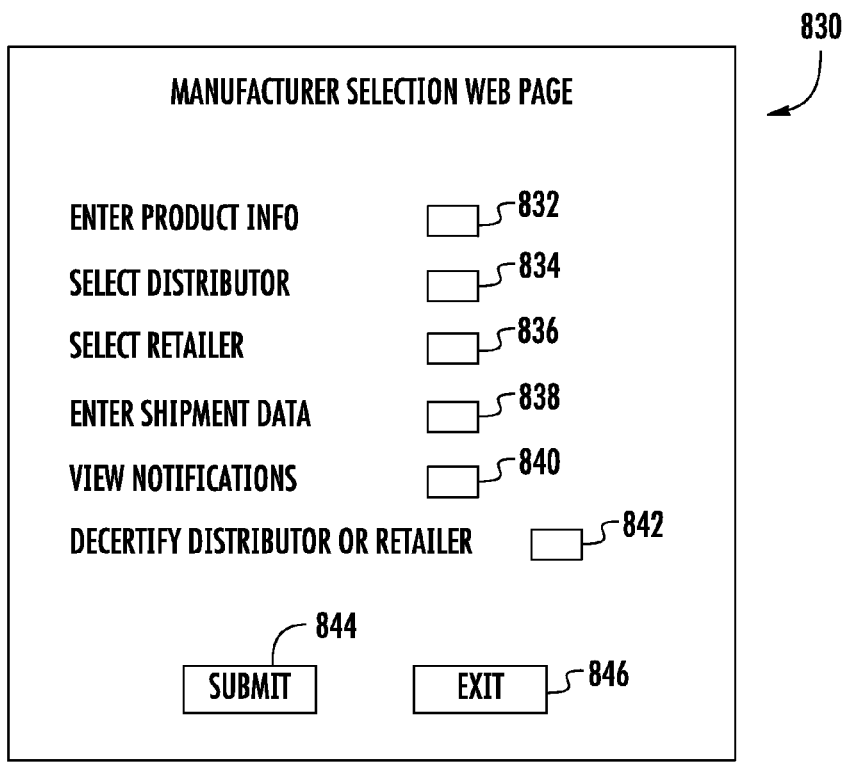
FIG. 13 is a schematic of a manufacturer selection web page utilized in the system of FIG. 10.

Referring to FIGS. 10 and 13, after the manufacturer logs into the central computer server 610 and is verified as a registered business, the first computer 700 induces the first display device 702 to display the manufacturer selection web page 830 (shown in FIG. 13). The manufacturer selection web page 830 is only accessible by the manufacturer (and the certification and monitoring company) and is provided to allow a manufacturer to access other web pages to: (1) enter product information, (2) select a distributor, (3) select a retailer, (4) enter shipment data for the product shipped from the manufacturer to the distributor, (5) view notifications, and (6) to decertify the distributor or the retailer. The manufacturer selection web page 830 includes: (1) an enter product information checkbox 832, (2) a select distributor checkbox 834, (3) a select retailer checkbox 836, (4) an enter shipment data checkbox 838, (5) a view notification checkbox 840, (6) a decertify distributor or retailer checkbox 842, (7) a submit command button 844, and (8) an exit command button 846.

Figure 14:
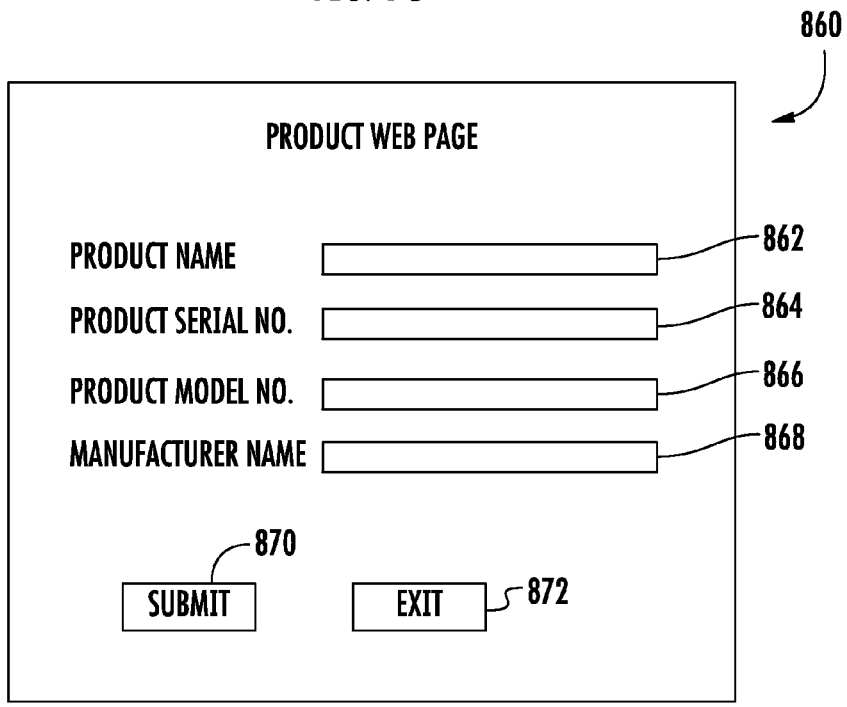
FIG. 14 is a schematic of a product web page utilized in the system of FIG. 10.

Referring to FIGS. 10, 13 and 14, if the manufacturer selects the enter product information checkbox 832 and selects the submit command button 844 utilizing the input device 704, the first computer 700 induces the first display device 702 to display the product web page 860 (shown in FIG. 14).

Referring to FIGS. 10, 13 and 15, if the manufacturer selects the select distributor checkbox 834 and selects the submit command button 844 utilizing the input device 704, the first computer 700 induces the first display device 702 to display the select distributor web page 890 (shown in FIG. 15).

Referring to FIGS. 10, 13 and 16, if the manufacturer selects the select retailer checkbox 836 and selects the submit command button 844 utilizing the input device 704, the first computer 700 induces the first display device 702 to display the select retailer web page 920 (shown in FIG. 16).

Figure 17:
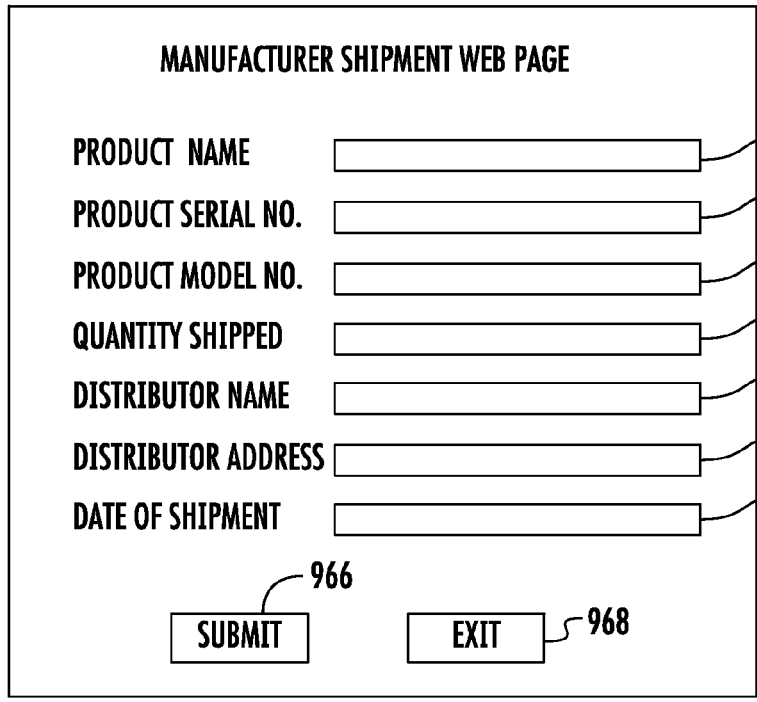
FIG. 17 is a schematic of a manufacturer shipment web page utilized in the system of FIG. 10.

Referring to FIGS. 10, 13 and 17, if the manufacturer selects the enter shipment data text box 838 and selects the submit command button 844 utilizing the input device 704, the first computer 700 induces the first display device 702 to display the manufacturer shipment web page 950 (shown in FIG. 17).

Figure 18:
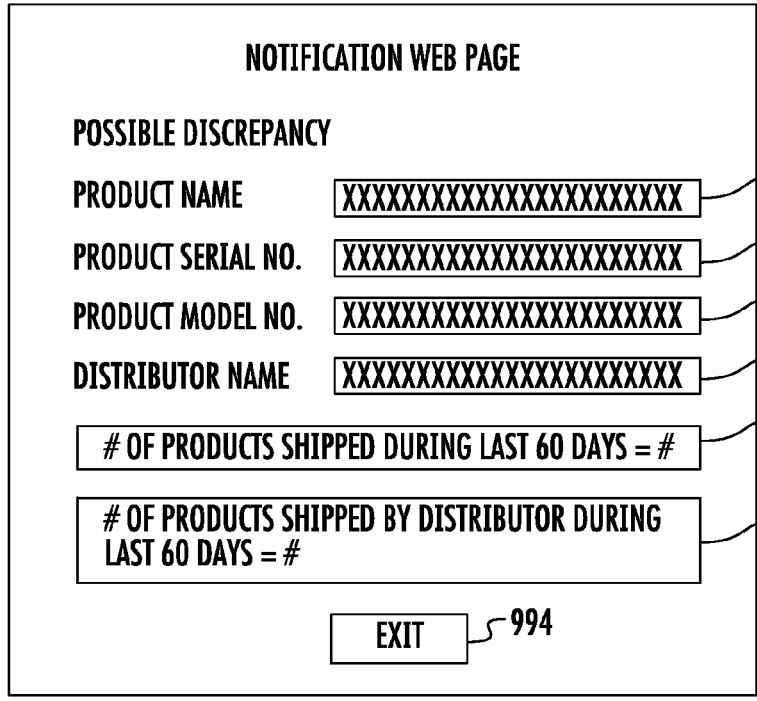
FIG. 18 is a schematic of a notification web page utilized in the system of FIG. 10.

Referring to FIGS. 10, 13 and 18, if the manufacturer selects the view notifications text box 840 and selects the submit command button 844 utilizing the input device 704, the first computer 700 induces the first display device 702 to display the notification web page 980 (shown in FIG. 18).

Figure 19:
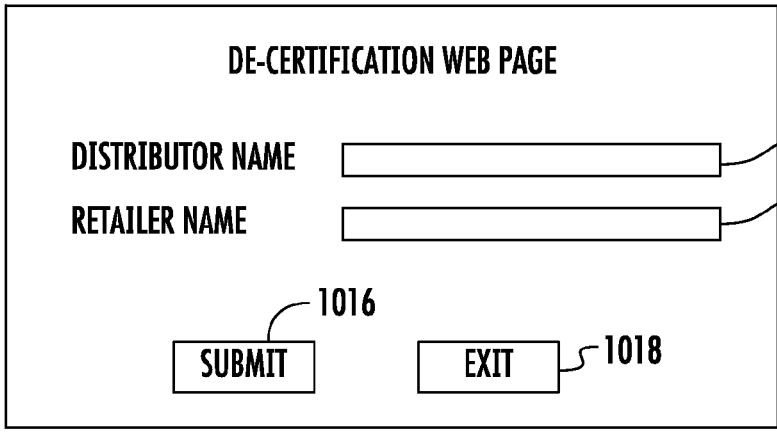
FIG. 19 is a schematic of a de-certification web page utilized in the system of FIG. 10.

Referring to FIGS. 10, 13 and 19, if the manufacturer selects the decertified distributor or retailer text box 842 and selects the submit command button 844 utilizing the input device 704, the first computer 700 induces the first display device 702 to display the de-certification web page 1010 (shown in FIG. 19).

Referring to FIGS. 10, 11 and 13, if the manufacturer selects the exit command button 846 utilizing the input device 704, the first computer 700 induces the first display device 702 to display the login web page 770 (shown in FIG. 11).

Product Web Page

Referring to FIGS. 10 and 14, the product web page 860 (shown in FIG. 14) is provided to allow a manufacturer to enter product information associated with a product manufactured by the manufacturer. The product web page 860 includes: a product name text box 862, a product serial number text box 864, a product model number text box 866, a manufacturer name text box 868, a submit command button 870, and an exit command button 872. The manufacturer can enter product information associated with a product manufactured by the manufacturer by performing the following steps: (1) inputting a product name in the product name text box 862 utilizing the input device 704, (2) inputting the product serial number in the product serial number text box 864 utilizing the input device 704, (3) inputting a product model number in the product model number text box 866 utilizing the input device 704, (4) inputting a manufacturer name for the product in the manufacturer name text box 868 utilizing the input device 704, and (5) selecting the submit command button 870 utilizing the input device 704.

Further, after the manufacturer inputs the data within the text boxes 862-868 and selects the submit command button 870, the data within the text boxes 862-868 is transferred through the Internet 620 to the central computer server 610. The certification monitoring software program 614 stores the received data within the memory 616 and associates the data with the manufacturer.

If the manufacturer selects the exit command button 872 utilizing the input device 704, the first computer 700 induces the first display device 702 to display the manufacturer selection web page 830 (shown in FIG. 13).

Select Distributor Web Page

Referring to FIGS. 10 and 15, the select distributor web page 890 (shown in FIG. 15) is provided to allow a manufacturer to enter information to select and certify a distributor that will receive the product manufactured by the manufacturer. The select distributor web page 890 includes: (1) a distributor name text box 892, (2) an address text box 894, (3) a telephone number text box 896, (4) an email address text box 898, (5) a contact person text box 900, (6) a submit command button 902, and (7) an exit command button 904. The manufacturer can enter information to select and certify a distributor that will receive the product manufactured by the manufacturer by performing the following steps: (1) inputting a distributor name in the distributor name text box 892 utilizing the input device 704, (2) inputting an address of the distributor in the address text box 894 utilizing the input device 704, (3) inputting a telephone number of the distributor in the telephone number text box 896 utilizing the input device 704, (4) inputting an email address of the distributor in the email address text box 898 utilizing the input device 704, (5v) inputting a contact person name for the distributor in the contact person text box 900 utilizing input device 704, and (6) selecting the submit command button 902 utilizing the input device 704.

Further, after the manufacturer inputs the data within the text boxes 892-900 and selects the submit command button 902, the data within the text boxes 892-900 is transferred through the Internet 620 to the central computer server 610. The certification monitoring software program 614 stores the received data within the memory 616 and associates the data with the manufacturer.

If the manufacturer selects the exit command button 904 utilizing the input device 704, the first computer 700 induces the first display device 702 to display the manufacturer selection web page 830 (shown in FIG. 13).

Select Retailer Web Page

Referring to FIGS. 10 and 16, the select retailer web page 920 is provided to allow a manufacturer to enter information to select and certify a retailer that will receive the product manufactured by the manufacturer from a certified distributor. The select retailer web page 920 includes: (1) a retailer name text box 922, (2) an address text box 924, (3) a telephone number text box 926, (4) an email address text box 928, (5) a contact person text box 930, (6) a submit command button 932, and an (7) exit command button 934. The manufacturer can enter information to select and certify a retailer that will receive the product manufactured by the manufacturer from the distributor by performing the following steps: (1) inputting a retailer name in the retailer name text box 922 utilizing the input device 704, (2) inputting an address of the retailer in the address text box 924 utilizing the input device 704, (3) inputting a telephone number of the retailer in the telephone number text box 946 utilizing the input device 704, (4) inputting an email address of the retailer in the email address text box 928 utilizing the input device 704, (5) inputting a contact person name for the retailer in the contact person text box 930 utilizing the input device 704, and (6) selecting the submit command button 932 utilizing the input device 704.

Further, after the manufacturer inputs the data within the text boxes 922-930 and selects the submit command button 932, the data within the text boxes 922-930 is transferred through the Internet 620 to the central computer server 610. The certification monitoring software program 614 stores the received data within the memory 616 and associates the data with the manufacturer.

If the manufacturer selects the exit command button 934 utilizing the input device 704, the first computer 700 induces the first display device 702 to display the manufacturer selection web page 830 (shown in FIG. 13).

Manufacturer Shipment Web Page

Referring to FIGS. 10 and 17, the manufacturer shipment web page 950 is provided to allow a registered manufacturer to enter information associated with a shipment of the product from the manufacturer to a distributor. The manufacturer shipment web page 950 (shown in FIG. 17) includes: (1) a product name text box 952, (2) a product serial number text box 954, (3) a product model number text box 956, (4) a quantity shipped text box 958, (5) a distributor name text box 960, (6) a distributor address text box 962, (7) a date of shipment text box 964, (8) a submit command button 966, and (9) an exit command button 968. The manufacturer can enter information associated with a shipment of the product from the manufacturer to the distributor by performing the following steps: (1) inputting a product name in the product name text box 952 utilizing the input device 704, (2) inputting a product serial number in the product serial text box 954 utilizing the input device 704, (3) inputting a product model number in the product model number text box 956 utilizing the input device 704, (4) inputting a quantity of product shipped to the distributor in the quantity shipped text box 958 utilizing the input device 704, (5) inputting a distributor name in the distributor name text box 960 utilizing the input device 704, and (6) inputting a distributor address in the distributor address text box 962 utilizing the input device 704, (7) inputting a date of shipment of the product to the distributor in the date of shipment text box 964, and (8) selecting the submit command button 966 utilizing the input device 704.

Further, after the manufacturer inputs the data within the text boxes 952-964 and selects the submit command button 966, the data within the text boxes 952-964 is transferred through the Internet 620 to the central computer server 610. The certification monitoring software program 614 stores the received data within the memory 616.

If the manufacturer selects the exit command button 968 utilizing the input device 704, the first computer 700 induces the first display device 702 to display the manufacturer selection web page 830 (shown in FIG. 13).

Notification Web Page

Referring to FIGS. 10 and 18, the notification web page 980 is provided to display messages indicating either (1) a certified distributor shipped a quantity of the product to retailers during a time period that was greater than a quantity of the product received by the distributor from the manufacturer during the time period, or (2) certified retailers sold a quantity of the product to the customers during a time period that was greater than a quantity of the product shipped to the retailers by the certified distributor during the time period.

An exemplary notification web page 980 includes: (1) a product name message 982, (2) a product serial number message 984, (3) a product model number message 986, (4) a distributor name message 988, (5) a product shipment message 990, (6) a product shipment message 992, and (7) an exit command button 994. The product serial number message 984 lists the name of the product. The product serial number message 984 lists the product serial number of the product. The distributor name message 988 lists the name of the distributor. The product shipment message 990 indicates the number of products shipped from the manufacturer to the distributor during a predetermined time interval (e.g., 60 days). The product shipment message 992 indicates a number of products shipped by the distributor to retailers during the predetermined time interval (e.g., 60 days).

If the manufacturer selects the exit command button 994 utilizing the input device 704, the first computer 700 induces the first display device 702 to display the manufacturer selection web page 830 (shown in FIG. 13).

It should be noted that the notification web page 990 could further include a retailer name message and first and second messages. The first message could indicate a number of products shipped by a distributor to retailers during a predetermined time interval (e.g., 60 days). The second message could indicate a number of products sold by the retailers during the predetermined time interval (e.g., 60 days).

De-Certification Web Page

Referring to FIGS. 10 and 19, the de-certification web page 1010 (shown in FIG. 19) includes: (1) a distributor name text box 1012, (2) a retailer name text box 1014, (3) a submit command button 1016, and (4) an exit command button 1018. The manufacturer can enter information to decertify either a distributor or a retailer utilizing the decertification web page 1010. In particular, the manufacturer can decertify a distributor by performing the following steps: (1) inputting a distributor name in the distributor name text box 1012 and (2) selecting the submit command button 1016 utilizing the input device 704. Further, the manufacturer decertifies a retailer by performing the following steps: (1) inputting a retailer name in the retailer name text box 1014 and (2) selecting the submit command button 1016 utilizing the input device 704.

Further, after the manufacturer inputs the data within either the text box 1012 or the text box 1014, and selects the submit command button 1016, the data within the either the text box 1012 or the text box 1014 is transferred through the Internet 620 to the central computer server 610. The certification monitoring software program 614 stores the received data within the memory 616 and associates the data with the manufacturer.

If the manufacturer selects the exit command button 1018 utilizing the input device 704, the first computer 700 induces the first display device 702 to display the manufacturer selection web page 830 (shown in FIG. 13).

Distributor

Referring to FIG. 10, the distributor system 640 is owned and operated by a distributor that was previously certified by the manufacturer. The distributor system 640 includes a second computer 710, a second display device 712, and an input device 714. The second display device 712 and the input device 714 are operably coupled to the second computer 710. In an exemplary embodiment, the input device 714 is at least one of a computer keyboard and a computer mouse.

Referring to FIGS. 10 and 11, when a previously certified distributor attempts to access the certification of monitoring software program 614 utilizing the second computer 710 via the Internet 620, the second computer 710 induces the second display device 712 to display the login web page 770. The certification monitoring software program 614 allows the distributor to login to the central computer server 610 by performing the following steps: (1) selecting the distributor login checkbox 774 utilizing the input device 714, (2) inputting a valid user name in the user name text box 780 utilizing input device 714, (3) inputting a valid password in the password text box 782 utilizing the input device 714, and (4) selecting the login command button 784 utilizing the input device 714.

Further, after the distributor inputs the data within the text boxes 780, 782 and selects the checkbox 774 and the login command button 784, the data within the text boxes 780, 782 is transferred through the Internet 620 to the central computer server 610. The certification monitoring software program 614 determines whether the distributor has entered a user name and password that correspond to a stored user name and password, respectively, and logs the distributor into the central computer server 610 if the user name and password correspond to the stored user name and password, respectively.

Distributor Shipment Web Page

Figure 20:
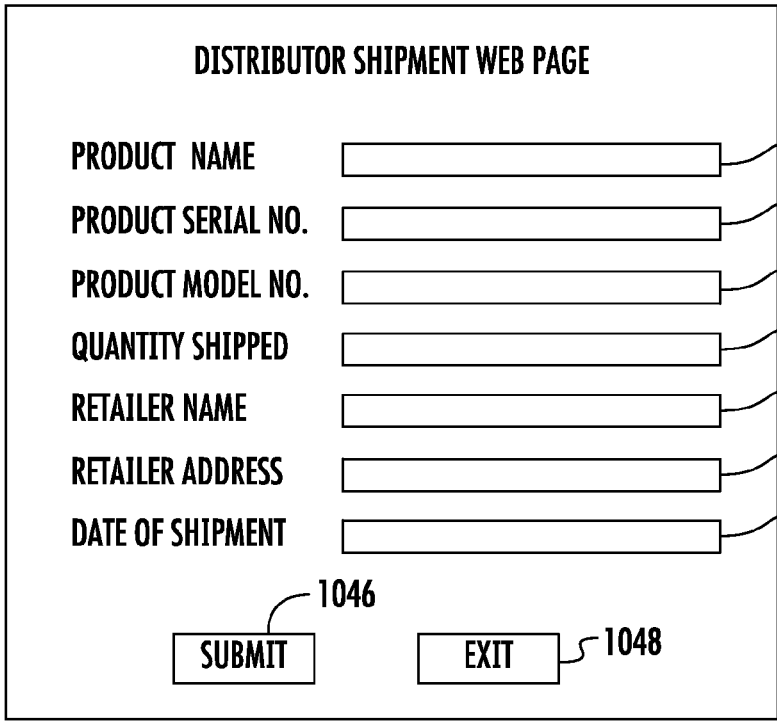
FIG. 20 is a schematic of a distributor shipment web page utilized in the system of FIG. 10.

Referring to FIGS. 10 and 20, after the distributor logs into the central computer server 610, the second computer 710 induces the second display device 712 to display the distributor shipment web page 1030 (shown in FIG. 20). The distributor shipment web page 1030 is provided to allow a certified distributor to enter shipment information associated with shipments of the product from the manufacturer to certified retailers. The distributor shipment web page 1030 includes: (1) a product name text box 1032, (2) a product serial number text box 1034, (3) a product model number text box 1036, (4) a quantity shipped text box 1038, (5) a retailer name text box 1040, (6) a retailer address text box 1042, (7) a date of shipment text box 1044, (8) a submit command button 1046, and (9) an exit command button 1048. The distributor can enter information associated with a shipment of the product to a retailer by performing the following steps: (1) inputting a product name in the product name text box 1032 utilizing the input device 714, (2) inputting a product serial number in the product serial text box 1034 utilizing the input device 714, (3) inputting a product model number in the product model number text box 1036 utilizing the input device 714, (4) inputting a quantity of product shipped to the retailer in the quantity shipped text box 1038 utilizing the input device 714, (5) inputting a retailer name in the retailer name text box 1040 utilizing the input device 714, and (6) inputting a retailer address in the retailer address text box 962 utilizing the input device 714, (7) inputting a date of shipment of the product to the retailer in the date of shipment text box 1044, and (8) selecting the submit command button 1046 utilizing the input device 714.

Further, after the distributor inputs the data within the text boxes 1032-1044 and selects the submit command button 1046, the data within the text boxes 1032-1044 is transferred through the Internet 620 to the central computer server 610. The certification monitoring software program 614 stores the received data within the memory 616 and associates the data with the distributor and the manufacturer.

If the manufacturer selects the exit command button 1048 utilizing the input device 714, the second computer 710 induces the second display device 712 to display the login web page 770 (shown in FIG. 11).

First Retailer

Referring to FIG. 10, the first retailer system 650 is owned and operated by a first retailer that was previously certified by the manufacturer. The first retailer system includes a third computer 720, a third display device 722, and an input device 724. The third display device 722 and the input device 724 are operably coupled to the third computer 720. In an exemplary embodiment, the input device 724 is at least one of a computer keyboard and a computer mouse.

Figure 21:
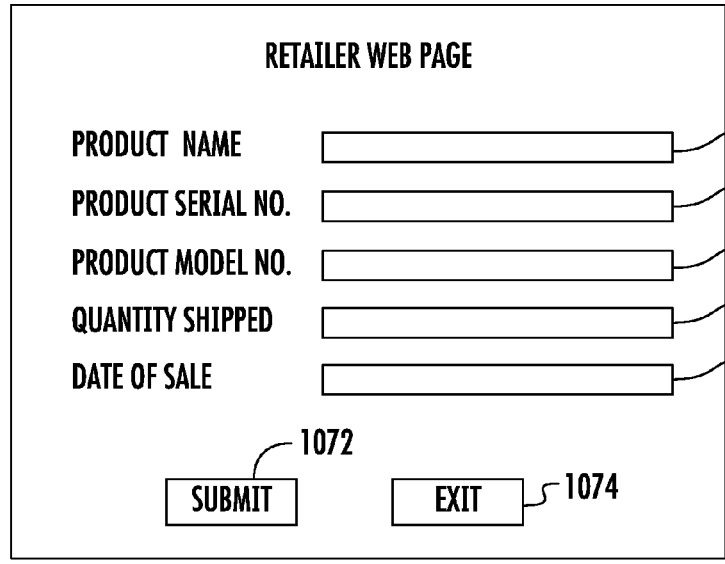
FIG. 21 is a schematic of a retailer web page utilized in the system of FIG. 10.

Referring to FIGS. 10 and 21, when a previously certified first retailer attempts to access the certification of monitoring software program 614 utilizing the third computer 720 via the Internet 620, the third computer 720 induces the third display device 722 to display the login web page 770. The certification monitoring software program 614 allows the first retailer to login to the central computer server 610 by performing the following steps: (1) selecting the retailer login checkbox 776 utilizing the input device 724, (2) inputting a valid user name in the user name text box 780 utilizing input device 724, (3) inputting a valid password in the password text box 782 utilizing the input device 724, and (4) selecting the login command button 784 utilizing the input device 724.

Further, after the first retailer inputs the data within the text boxes 780, 782 and selects the checkbox 772 and the login command button 784, the data within the text boxes 780, 782 is transferred through the Internet 620 to the central computer server 610. The certification monitoring software program 614 determines whether the first retailer has entered a user name and password that correspond to a stored user name and password, respectively, and logs the first retailer into the central computer server 610 if the user name and password correspond to the stored user name and password, respectively.

Retailer Web Page Accessed by First Retailer

Referring to FIGS. 10 and 21, after the first retailer logs into the central computer server 610, the third computer 720 induces the third display device 722 to display the retailer web page 1060. The retailer web page 1060 is provided to allow the second retailer to enter sales information (e.g., a quantity of the product sold by the first retailer) associated with the product that was received from the certified distributor and manufactured by the manufacturer.

The retailer web page 1060 (shown in FIG. 21) includes: (1) a product name text box 1062, (2) a product serial number text box 1064, (3) a product model number text box 1066, (4) a quantity sold text box 1068, (5) a date of sale text box 1070, (6) a submit command button 1072, and (7) an exit command button 1074. The first retailer can enter information associated with the sale of the product by performing the following steps: (1) inputting a product name in the product name text box 1062 utilizing the input device 724, (2) inputting a product serial number in the product serial text box 1064 utilizing the input device 724, (3) inputting a product model number in the product model number text box 1066 utilizing the input device 724, (4) inputting a quantity of product sold in the quantity sold text box 1068 utilizing the input device 724, (5) inputting a date of sale of the product in the date of sale text box 1070, and (6) selecting the submit command button 1072 utilizing the input device 724.

Further, after the first retailer inputs the data within the text boxes 1062-1070 and selects the submit command button 1072, the data within the text boxes 1062-1070 is transferred through the Internet 620 to the central computer server 610. The certification monitoring software program 614 stores the received data within the memory 616 and associates the data with the first retailer and the manufacturer.

If the first retailer selects the exit command button 1074 utilizing the input device 724, the third computer 720 induces the third display device 722 to display the login web page 770 (shown in FIG. 11).

Second Retailer

Referring to FIG. 10, the second retailer system 660 is owned and operated by a second retailer that was previously certified by the manufacturer. The second retailer system 660 includes a fourth computer 730, the fourth display device 732, and an input device 734. The fourth display device 732 and the input device 734 are operably coupled to the fourth computer 730. In an exemplary embodiment, the input device 734 is at least one of a computer keyboard and a computer mouse.

Referring to FIGS. 10 and 21, when a previously certified second retailer attempts to access the certification of monitoring software program 614 utilizing the fourth computer 730 via the Internet 620, the fourth computer 730 induces the fourth display device 732 to display the login web page 770. The certification monitoring software program 614 allows the second retailer to login to the central computer server 610 by performing the following steps: (1) selecting the retailer login checkbox 776 utilizing the input device 734, (2) inputting a valid user name in the user name text box 780 utilizing input device 734, (3) inputting a valid password in the password text box 782 utilizing the input device 734, and (4) selecting the login command button 784 utilizing the input device 734.

Further, after the second retailer inputs the data within the text boxes 780, 782 and selects the checkbox 776 and the login command button 784, the data within the text boxes 780, 782 is transferred through the Internet 620 to the central computer server 610. The certification monitoring software program 614 determines whether the second retailer has entered a user name and password that correspond to a stored user name and password, respectively, and logs the second retailer into the central computer server 610 if the user name and password correspond to the stored user name and password, respectively.

Retailer Web Page Accessed by Second Retailer

Referring to FIGS. 10 and 21, after the second retailer logs into the central computer server 610, the fourth computer 730 induces the fourth display device 732 to display the retailer web page 1060. The retailer web page 1060 is provided to allow the second retailer to enter sales information (e.g., a quantity of the product sold by the second retailer) associated with the product that was received from the certified distributor and manufactured by the manufacturer.

The second retailer can enter information associated with the sale of the product by performing the following steps: (1) inputting a product name in the product name text box 1062 utilizing the input device 734, (2) inputting a product serial number in the product serial text box 1064 utilizing the input device 734, (3) inputting a product model number in the product model number text box 1066 utilizing the input device 734, (4) inputting a quantity of product sold in the quantity sold text box 1068 utilizing the input device 734, (5) inputting a date of sale of the product in the date of sale text box 1070 utilizing the input device 734, and (6) selecting the submit command button 1072 utilizing the input device 734.

Further, after the second retailer inputs the data within the text boxes 1062-1070 and selects the submit command button 1072, the data within the text boxes 1062-1070 is transferred through the Internet 620 to the central computer server 610. The certification monitoring software program 614 stores the received data within the memory 616 and associates the data with the second retailer and the manufacturer.

If the second retailer selects the exit command button 1074 utilizing the input device 724, the fourth computer 730 induces the fourth display device 732 to display the login web page 770 (shown in FIG. 11).

Customer

Referring to FIG. 10, the customer system 670 is owned and operated by a customer who purchased a product or wants to verify the same. The customer computer system 670 includes a fifth computer 740, a fifth display device 742, and an input device 744. The fifth display device 742 and the input device 744 are operably coupled to the fifth computer 740. In an exemplary embodiment, the input device 744 is at least one of a computer keyboard and a computer mouse.

Figure 22:
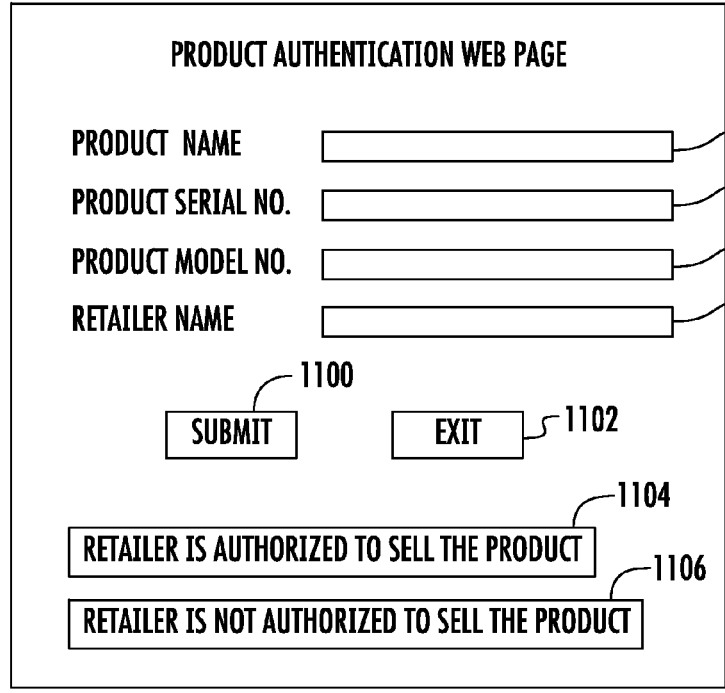
FIG. 22 is a schematic of a product authentication web page utilized in the system of FIG. 10.
Figure 24:
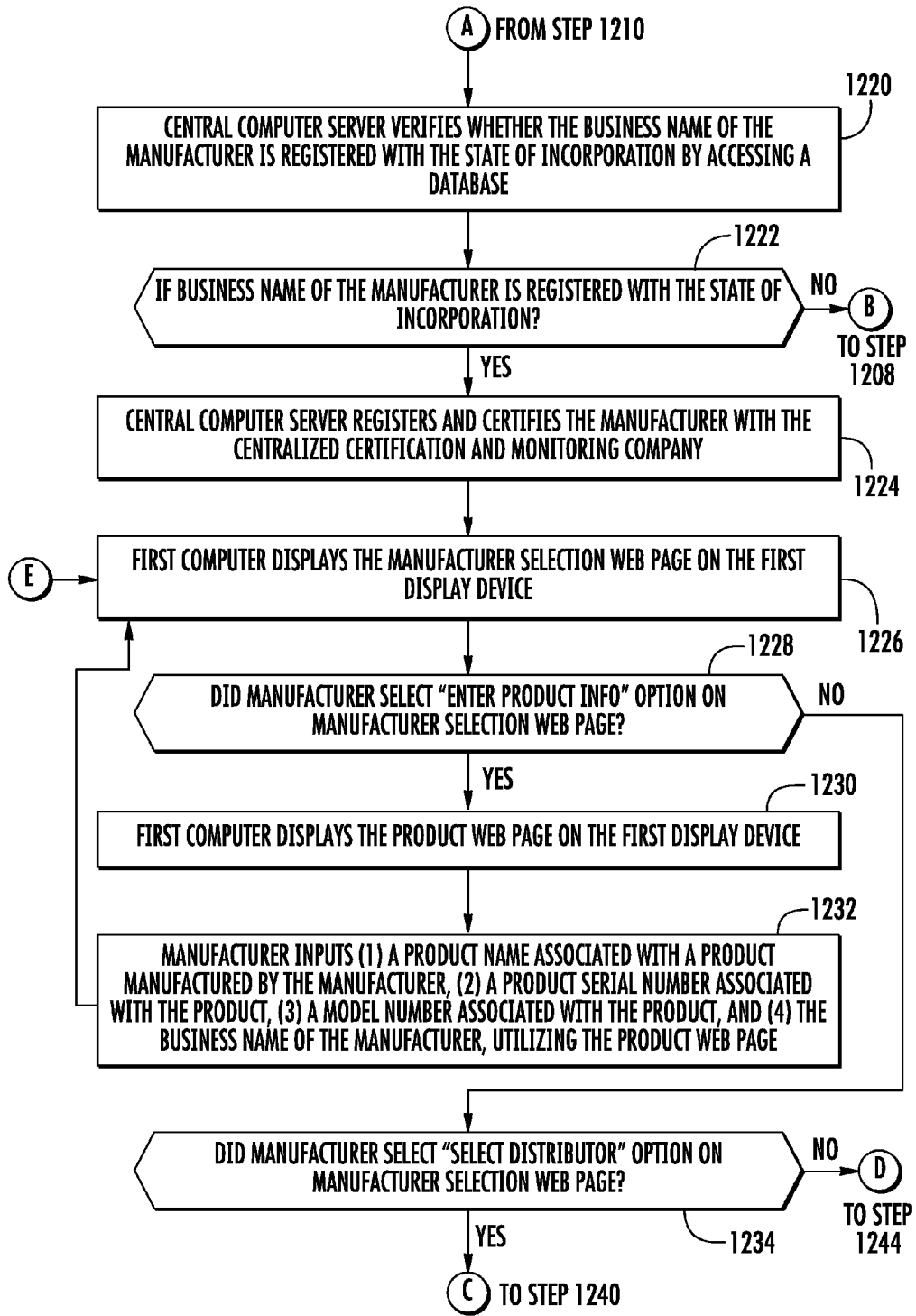
Figure 25:
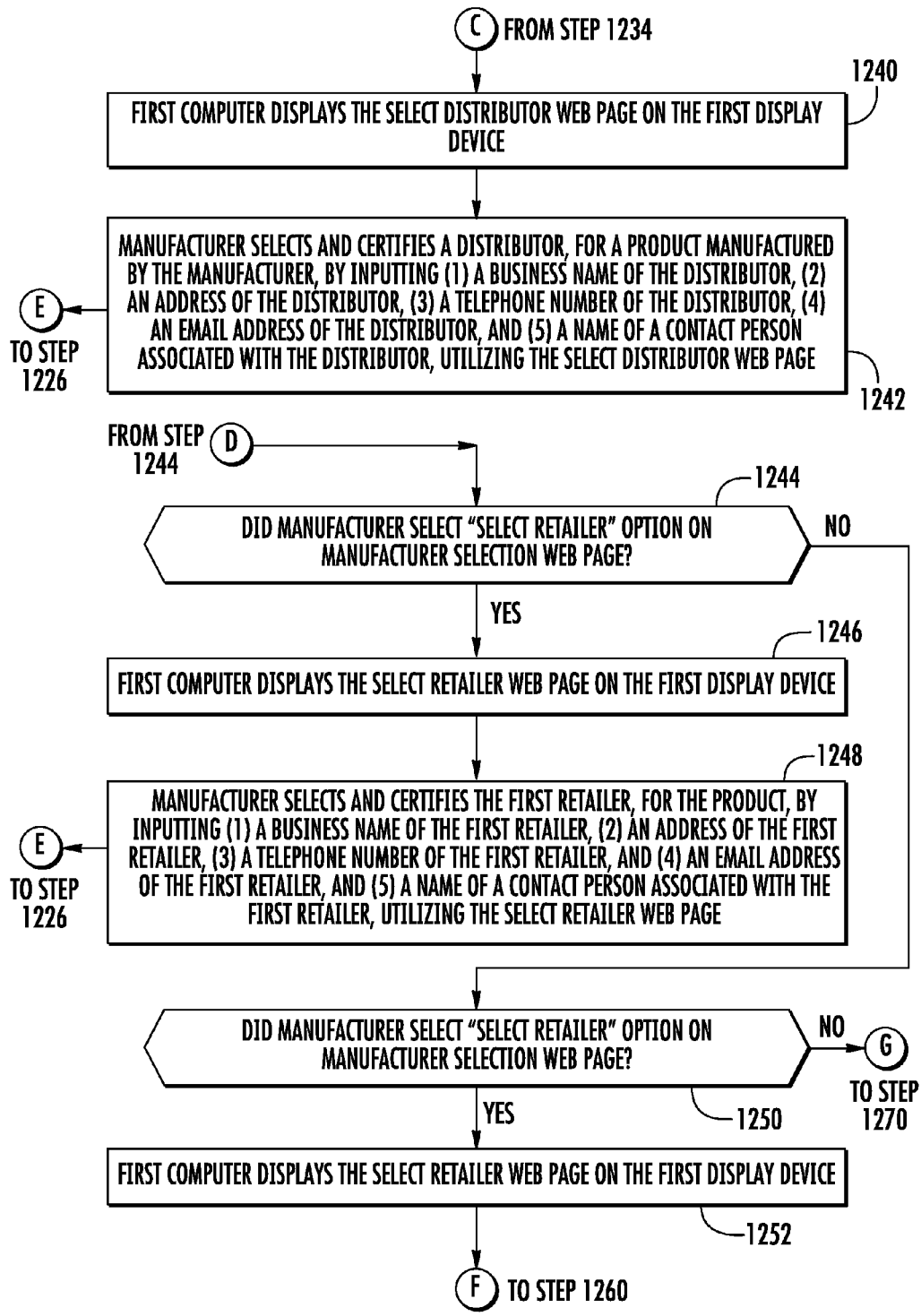
Figure 26:
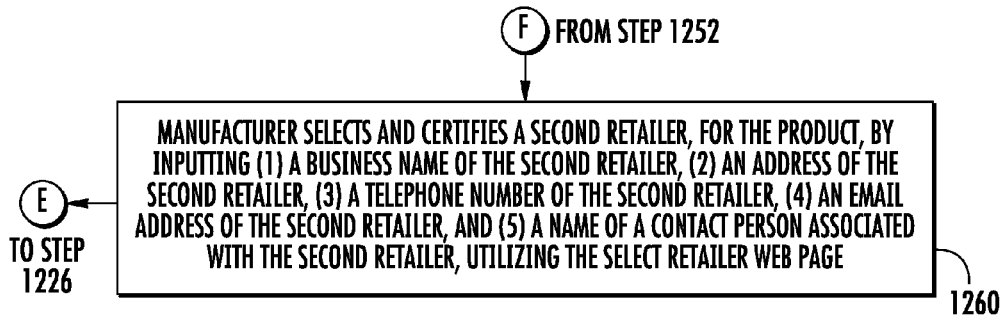
Figure 27:
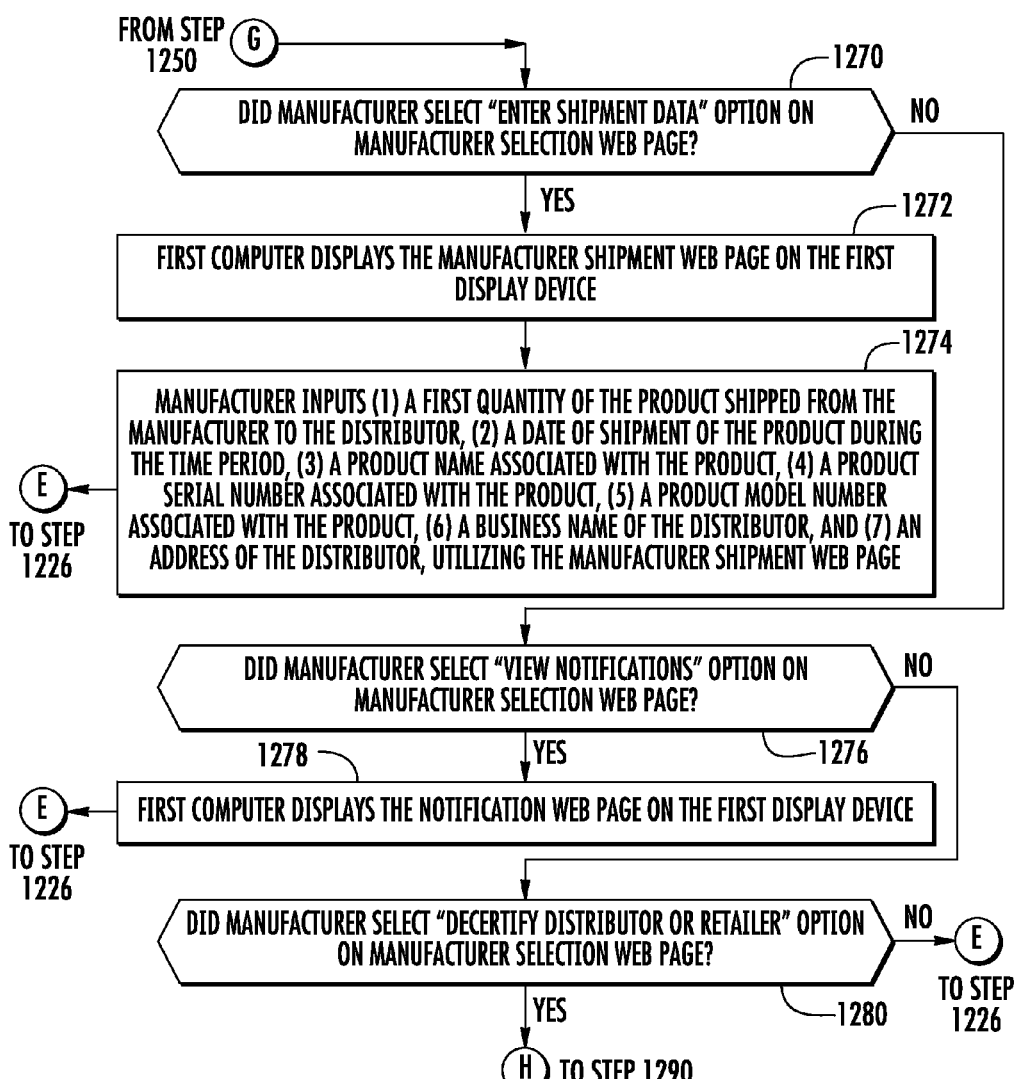
Figure 28:
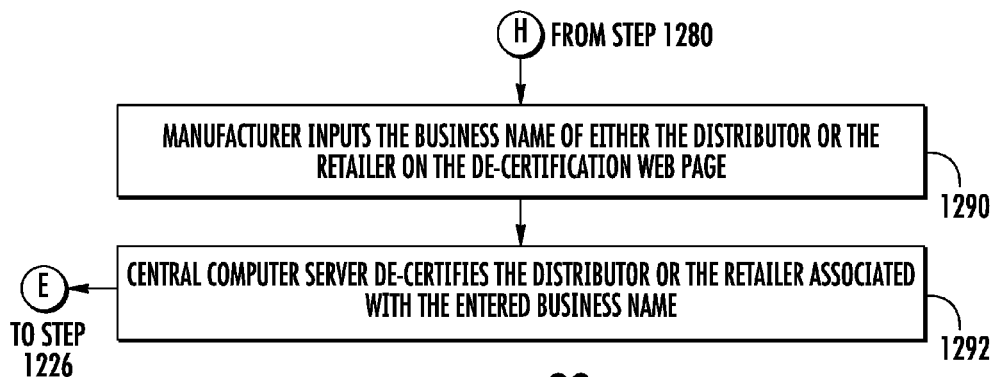

Referring to FIGS. 10, 11 and 22, when the fifth computer 740 accesses the login web page 770, the fifth computer 740 induces the display device 742 to display the login web page 770. Thereafter, the customer can select the authenticate product text box 772, and in response, the fifth computer 740 induces the fifth display device 742 to display the product authentication web page 1090.

The product authentication web page 1090 is provided to allow a customer to determine whether a retailer who wants to sell or has already sold a product to the customer is a certified retailer for selling the product. The product authentication web page 1090 includes (1) a product name text box 1092, (2) a product serial number text box 1094, (3) a product model number text box 1096, (4) a retailer name text box 1098, (5) a submit command button 1100, and (6) an exit command button 1102.

The customer can determine whether a retailer who sold a product to the customer is a certified retailer for selling the product by performing the following steps: (1) inputting a product name in the product name text box 1092 utilizing the input device 744, (2) inputting a product serial number in the product serial text box 1094 utilizing the input device 744, (3) inputting a product model number in the product model number text box 1096 utilizing the input device 744, (4) inputting a retailer name in the retailer name text box 1098 utilizing the input device 744, and (5) selecting the submit command button 1100 utilizing the input device 744.

Further, after the customer inputs the data within the text boxes 1092-1098 and selects the submit command button 1100, the data within the text boxes 1092-1098 is transferred through the Internet 620 to the central computer server 610. The certification monitoring software program 614 determines whether the retailer having the input retailer name has been selected and certified by the manufacturer to sell the product. If so, the central computer server 610 sends a first authentication message to the fifth computer 740 such that the fifth computer 740 induces the fifth display device 742 to display the message 1104 on the web page 1090. The message 1104 indicates that the retailer is authorized to sell the product. If not, the central computer sends a second authentication message to the fifth computer 740 such that the fifth computer 740 induces the fifth display device 742 to display the message 1106 on the web page 1090. The message 1106 indicates that the retailer is not authorized to sell the product.

If the customer selects the exit command button 1102 utilizing the input device 744, the fifth computer 740 induces the fifth display device 742 to display the login web page 770 (shown in FIG. 11).

Figure 29:
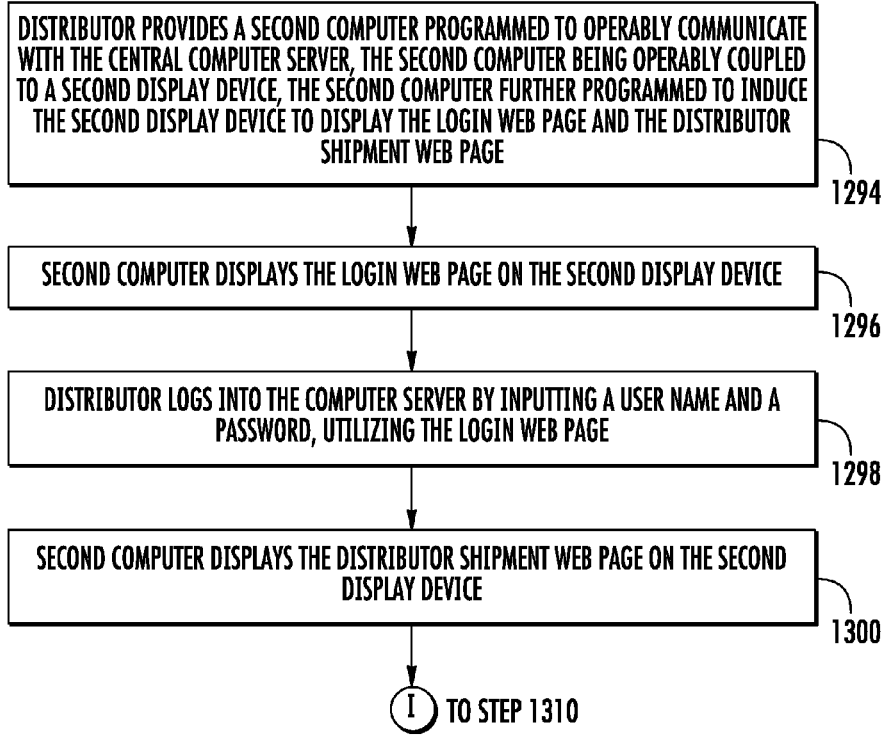
Figure 30:
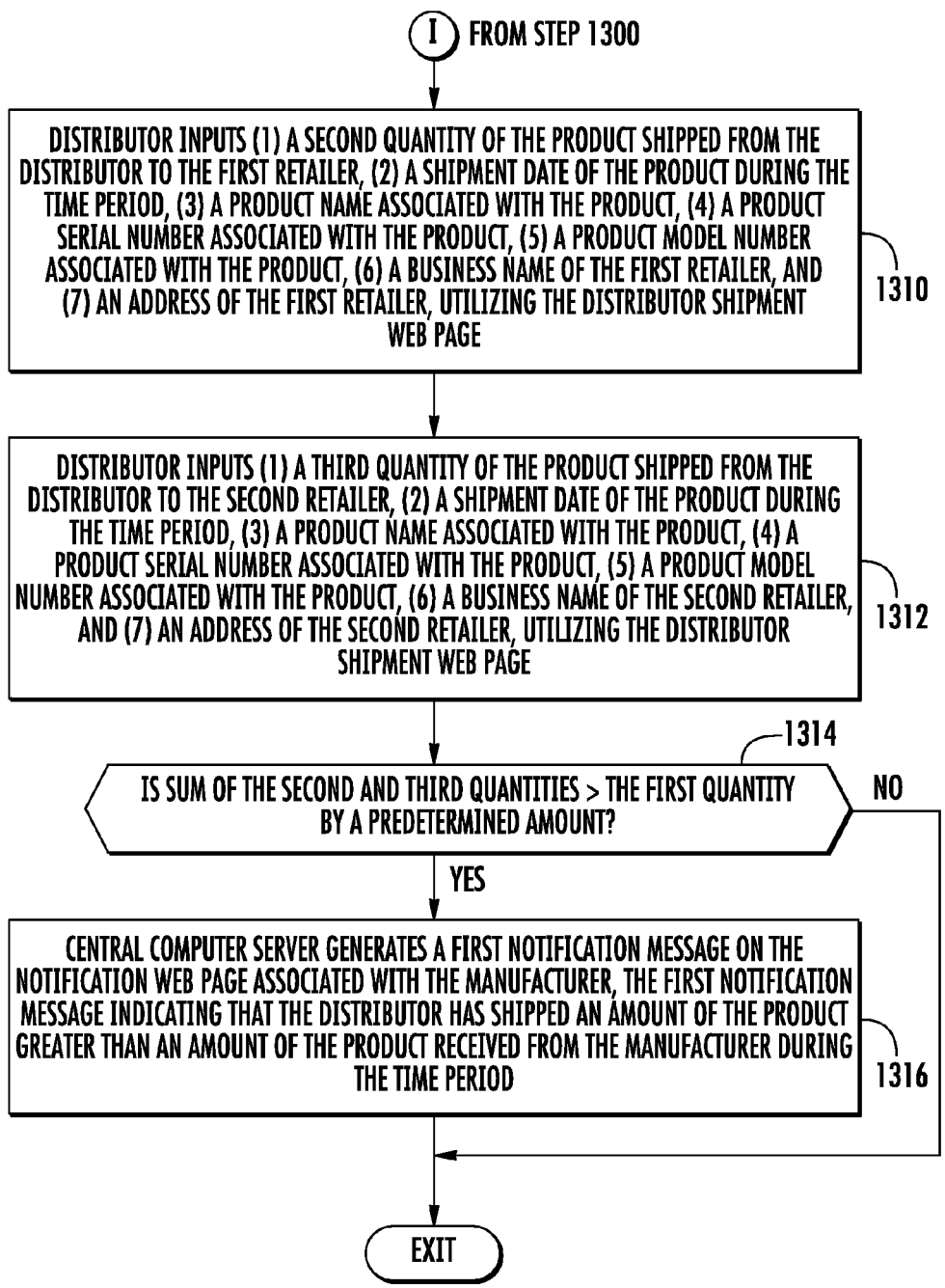
Figure 32:
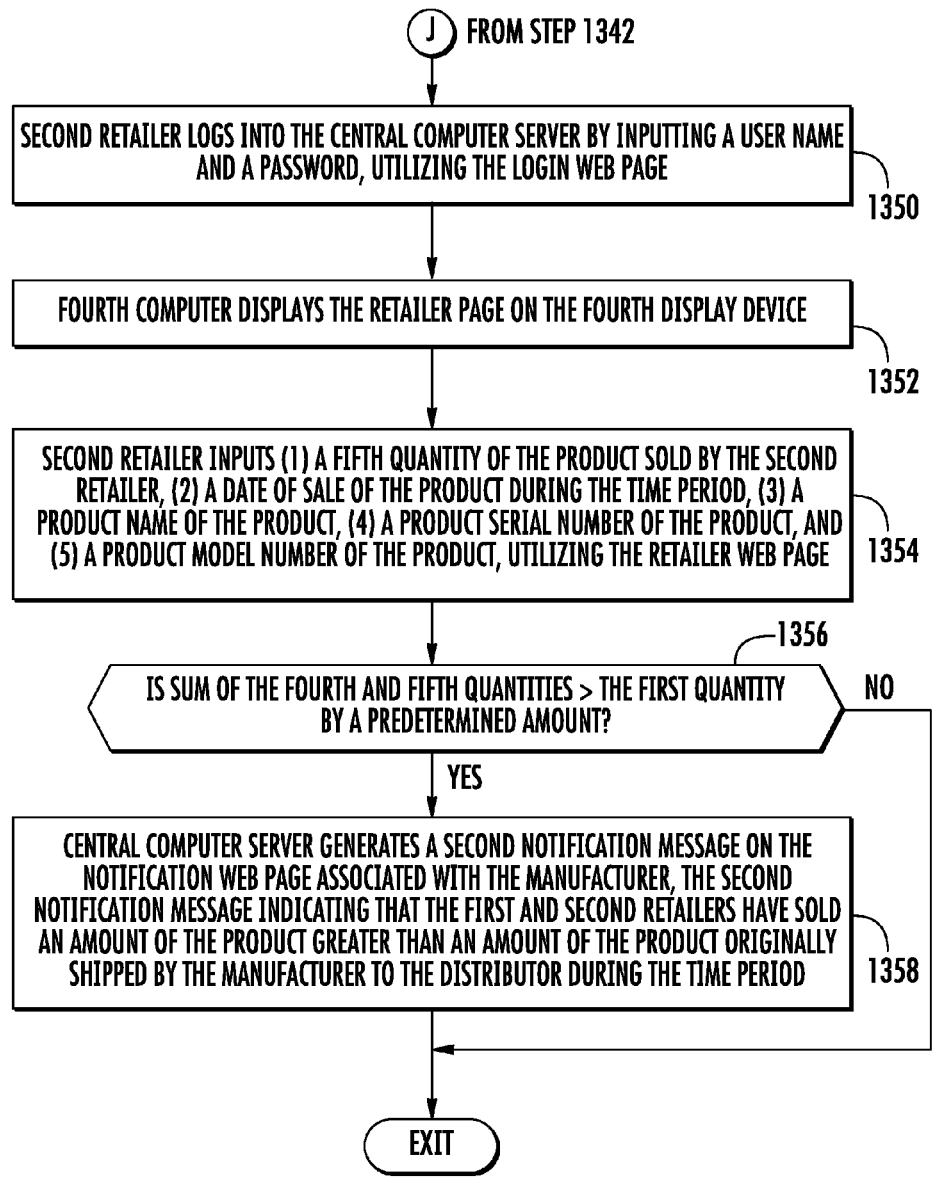
Figure 33:
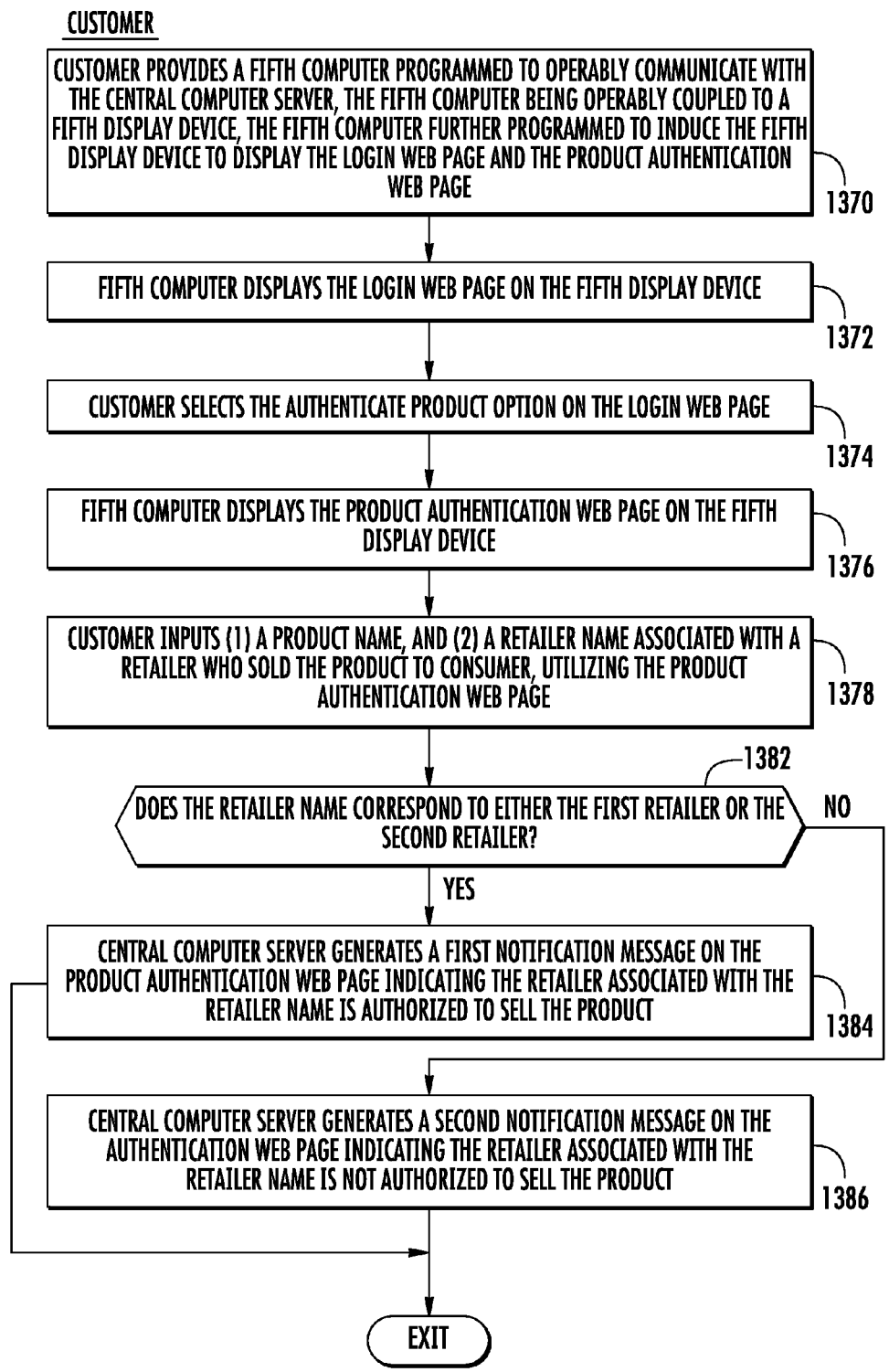

Referring to FIGS. 23-33, flowcharts of a method for certifying and monitoring commercial activity of a manufacturer, a distributor, and retailers in a product supply chain in accordance with another exemplary embodiment is provided. In particular, FIGS. 23-28 describe portions of the flowcharts implemented by the certification and monitoring company and the manufacturer. FIGS. 29-30 describe portions of the flowcharts implemented by the certification and monitoring company and the distributor. FIGS. 31-32 describe portions of the flowcharts implemented by the certification and monitoring company and the first and second retailers. FIG. 33 describes a portion of the flowcharts implemented by the certification and monitoring company and a customer.

Referring to FIGS. 23-28, the portions of the flowcharts implemented by the certification and monitoring company and the manufacturer will now be described.

At step 1200, a certification and monitoring company provides the central computer server 610 that is owned and managed by the certification and monitoring company. The central computer server 610 has a certification and monitoring software program 614 programmed to generate (1) the login web page 770, (2) the manufacturer registration web page 800, (3) the manufacturer selection web page 830, (4) the product web page 860, (5) the select distributor web page 890, (6) the select retailer web page 920, (7) the manufacturer shipment web page 950, (8) the distributor shipment web page 1030, (9) the retailer web page 1060, (10) the product authentication web page 1090, (11) the notification web page 980, and (12) the de-certification web page 1010. After step 1200, the method advances to step 1202.

At step 1202, the manufacturer provides the first computer 700 programmed to operably communicate with the central computer server 610. The first computer 700 is operably coupled to a first display device 702. The first computer 700 is further programmed to induce the first display device 702 to selectively display (1) the login web page 770, (2) the manufacturer registration web page 800, (3) the manufacturer selection web page 830, (4) the product web page 860, (5) the select distributor web page 890, (6) the select retailer web page 920, (7) the manufacturer shipment web page 950, (8) a notification web page 980, and (9) a de-certification web page 1010. After step 1202, the method advances to step 1204.

At step 1204, the first computer 700 displays the login web page 770 on the first display device 702. After step 1204, the method advances to step 1206.

At step 1206, the manufacturer logs into the central computer server 610 by inputting a user name and a password, utilizing the login web page 770. After step 1206, the method advances to step 1208.

At step 1208, the first computer 700 displays the manufacturer registration web page 800 on the first display device 702. After step 1208, the method advances to step 1210.

At step 1210, the manufacturer inputs (1) a business name of the manufacturer, (2) a business address of the manufacturer (3) a state of incorporation associated with the business name, (4) a telephone number of the manufacturer, (5) an email address associated with the manufacturer, and (6) a name of a contact person associated with the manufacturer, utilizing the manufacturer registration web page 800. After step 1210, the method advances to step 1220.

At step 1220, the central computer server 610 verifies whether the business name of the manufacturer is registered with the state of incorporation by accessing the database 690. After step 1220, method advances to step 1222.

At step 1222, the central computer server 610 makes a determination as to whether the business name of the manufacturer is registered with the state of incorporation. If the value of step 1222 equals "yes", the method advances to step 1224. Otherwise, the method returns to step 1208.

At step 1224, the central computer server 610 registers and certifies the manufacturer with the centralized certification and monitoring company, and stores a registration record associated with the manufacturer in the memory device 616. After step 1224, the method advances to step 1226.

At step 1226, the first computer 700 displays the manufacturer selection web page 830 on the first display device 702. After step 1226, the method advances to step 1228.

At step 1228, the first computer 700 makes a determination as to whether the manufacturer selected the "ENTER PRODUCT INFO" option on manufacturer selection web page 830. If the value of step 1228 equals "yes", the method advances to step 1230. Otherwise, the method advances to step 1234.

At step 1230, the first computer 700 displays the product web page 860 on the first display device 702. After step 1230, the method advances to step 1232.

At step 1232, the manufacturer inputs (1) a product name associated with a product manufactured by the manufacturer, (2) a product serial number associated with the product, (3) a model number associated with the product, and (4) the business name of the manufacturer, utilizing the product web page 860. After step 1232, the method returns to step 1226.

At step 1234, the first computer 700 makes a determination as to whether the manufacturer selected the "SELECT DIS- TRIBUTOR" option on manufacturer selection web page 830. If the value of step 1234 equals "yes", the method advances to step 1240. Otherwise, the method advances to step 1244.

At step 1240, the first computer 700 displays the select distributor web page 890 on the first display device 702. After step 1240, the method advances to step 1242.

At step 1242, the manufacturer selects and certifies a distributor, for a product manufactured by the manufacturer, by inputting (1) a business name of the distributor, (2) an address of the distributor, (3) a telephone number of the distributor, (4) an email address of the distributor, and (5) a name of a contact person associated with the distributor, utilizing the select distributor web page 890. After step 1242, the method returns to step 1226.

Referring again to step 1234, if the value of step 1234 equals "no", the method advances to step 1244. At step 1244, the first computer 700 makes a determination as to whether the manufacturer selected the "SELECT RETAILER" option on manufacturer selection web page 830. If the value of step 1244 equals "yes", the method advances to step 1246. Otherwise, the method advances to step 1250.

At step 1246, the first computer 700 displays the select retailer web page 920 on the first display device 702. After step 1246, the method advances to step 1248.

At step 1248, the manufacturer selects and certifies the first retailer, for the product, by inputting (1) a business name of the first retailer, (2) an address of the first retailer, (3) a telephone number of the first retailer, and (4) an email address of the first retailer, and (5) a name of a contact person associated with the first retailer, utilizing the select retailer web page 920. After step 1248, the method returns to step 1226.

Referring again to step 1244, if the value of step 1244 equals "no", the method advances to step 1250. At step 1250, the first computer 700 makes a determination as to whether the manufacturer selected the "SELECT RETAILER" option on manufacturer selection web page 830. If the value of step 1250 equals "yes", the method advances to step 1252. Otherwise, the method advances to step 1270.

At step 1252, the first computer 700 displays the select retailer web page 920 on the first display device 702. After step 1252, the method advances to step 1260.

At step 1260, the manufacturer selects and certifies a second retailer, for the product, by inputting (1) a business name of the second retailer, (2) an address of the second retailer, (3) a telephone number of the second retailer, (4) an email address of the second retailer, and (5) a name of a contact person associated with the second retailer, utilizing the select retailer web page 920. After step 1260, the method returns to step 1226.

Referring again to step 1250, if the value of step 1250 equals "no", the method advances to step 1270. At step 1270, the first computer 700 makes a determination as to whether the manufacturer selected the "ENTER SHIPMENT DATA" option on manufacturer selection web page 830. If the value of step 1270 equals "yes", the method advances to step 1272. Otherwise, the method advances to step 1276.

At step 1272, the first computer 700 displays the manufacturer shipment web page 950 on the first display device 702. After step 1272, the method advances to step 1274.

At step 1274, the manufacturer inputs (1) a first quantity of the product shipped from the manufacturer to the distributor, (2) a date of shipment of the product during the time period, (3) a product name associated with the product, (4) a product serial number associated with the product, (5) a business model number associated with the product, (6) a business name of the distributor, and (7) an address of the distributor, utilizing the manufacturer shipment web page 950. After step 1274, the method returns to step 1226.

Referring again to step 1270, if the value of step 1270 equals "no", the method advances to step 1276. At step 1276, the first computer 700 makes a determination as to whether the manufacturer selected "VIEW NOTIFICATIONS" option on manufacturer selection web page 830. If the value of step 1276 equals "yes", the method advances to step 1278. Otherwise, the method advances to step 1280.

At step 1278, the first computer 700 displays the notification web page 980 on the first display device 702. After step 1278, the method returns to step 1226.

Referring again to step 1276. If the value of step 1276 equals "no", the method advances to step 1280. At step 1280, the first computer 700 makes a determination as to whether the manufacturer selected the "DECERTIFY DISTRIBUTOR OR RETAILER" option on manufacturer selection web page 830. If the value of step 1280 equals "yes", the method advances to step 1290. Otherwise, the method returns to step 1226.

At step 1290, the manufacturer inputs the business name of either the distributor or the retailer on the de-certification web page 1010. After step 1290, the method advances to step 1292.

At step 1292, the central computer server 610 de-certifies the distributor or the retailer associated with the entered business name. After step 1292, the method returns to step 1226.

Referring to FIGS. 29-30, the portions of the flowcharts implemented by the certification and monitoring company and the distributor will now be described.

At step 1294, the distributor provides the second computer 710 programmed to operably communicate with the central computer server 610, the second computer 710 being operably coupled to the second display device 712. The second computer 710 is further programmed to induce the second display device 712 to display the login web page 770 and the distributor shipment web page 1030. After step 1294, the method advances to step 1296.

At step 1296, the second computer 710 displays the login web page 770 on the second display device 712. After step 1296, method advances to step 1298.

At step 1298, the distributor logs into the central computer server 610 by inputting a user name and a password, utilizing the login web page 770. After step 1298, the method advances to step 1300.

At step 1300, the second computer 710 displays the distributor shipment web page 1030 on the second display device 712. After step 1300, the method advances to step 1310.

At step 1310, the distributor inputs (1) a second quantity of the product shipped from the distributor to the first retailer, (2) a shipment date of the product during the time period, (3) a product name associated with the product, (4) a product serial number associated with the product, (5) a product model number associated with the product, (6) a business name of the first retailer, and (7) an address of the first retailer, utilizing the distributor shipment web page 1030. After step 1310, method advances to step 1312.

At step 1312, the distributor inputs (1) a third quantity of the product shipped from the distributor to the second retailer, (2) a shipment date of the product during the time period, (3) a product name associated with the product, (4) a product serial number associated with the product, (5) a product model number associated with the product, (6i) a business name of the second retailer, and (7) an address of the second retailer, utilizing the distributor shipment web page 1030. After step 1312, the method advances to step 1314.

At step 1314, the central computer server 610 makes a determination as to whether a sum of the second and third quantities is greater than the first quantity by a predetermined amount (e.g, 10% of the first quantity). If the value of step 1314 equals "yes", the method advances step 1316. Otherwise, the method is exited.

At step 1316, the central computer server 610 generates a first notification message on the notification web page 980 associated with the manufacturer. The first notification message indicates that the distributor has shipped an amount of the product greater than an amount of the product received from the manufacturer during the time period. After step 1316, method is exited.

Referring to FIGS. 31-32, the portions of the flowcharts implemented by the certification and monitoring company and the first and second retailers will now be described.

At step 1330, the first retailer provides a third computer 720 programmed to operably communicate with the central computer server 610. The third computer 720 is operably coupled to a third display device 722. The third computer 720 is further programmed to induce the third display device 722 to display the login web page 770 and the retailer web page 1060. After step 1330, the method advances to step 1332.

At step 1332, the third computer 720 displays the login web page 770 on the third display device 722. After step 1332, the method advances to step 1334.

At step 1334, the first retailer logs into the central computer server 610 by inputting a user name and a password, utilizing the login web page 770. After step 1334, the method advances to step 1336.

At step 1336, the third computer 720 displays the retailer web page 1060 on the third display device 722. After step 1336, the method advances to step 1338.

At step 1338, the first retailer inputs (1) a fourth quantity of the product sold by the first retailer, (2) a date of sale of the product during the time period, (3) a product name of the product, (4) a product serial number of the product, and (5) a product model number of the product, utilizing the retailer web page 1060. After step 1338, the method advances to step 1340.

At step 1340, the second retailer provides the fourth computer 730 programmed to operably communicate with the central computer server 610. The fourth computer 730 is operably coupled to the fourth display device 732. The fourth computer 730 is further programmed to induce the fourth display device 732 to display the login web page 770 and the retailer web page 1060. After step 1340, the method advances to step 1342.

At step 1342, the fourth computer 730 displays the login web page 770 on the fourth display device 732. After step 1342, the method advances step 1350.

At step 1350, the second retailer logs into the central computer server 610 by inputting a user name and a password, utilizing the login web page 770. After step 1350, the method advances to step 1352.

At step 1352, the fourth computer 730 displays the retailer page on he fourth display device 732. After step 1352, the method advances to step 1354.

At step 1354, the second retailer inputs (1) a fifth quantity of the product sold by the second retailer, (2) a date of sale of the product during the time period, (3) a product name of the product, (4) a product serial number of the product, and (5) a product model number of the product, utilizing the retailer web page 1060. After step 1354, the method advances to step 1356.

At step 1356, the central computer server 600 makes a determination as to whether the sum of the fourth and fifth quantities is greater than the first quantity by a predetermined amount (e.g., 10% of the first quantity). If the value of step 1356 equals "yes", the method advances to step 1358. Otherwise, the method is exited.

At step 1358, the central computer server 610 generates a second notification message on the notification web page 980 associated with the manufacturer. The second notification message indicates that the first and second retailers have sold an amount of the product greater than an amount of the product originally shipped by the manufacturer to the distributor during the time period. After step 1358, the method is exited.

Referring to FIG. 33, the portions of the flowcharts implemented by the certification and monitoring company and the customer will now he described.

At step 1370, the customer provides the fifth computer 740 programmed to operably communicate with the central computer server 610. The fifth computer 740 is operably coupled to the fifth display device 742. The fifth computer 740 is further programmed to induce the fifth display device 742 to display the login web page 770 and the product authentication web page 1090. After step 1370, the method advances to step 1372.

At step 1372, the fifth computer 740 displays the login web page 770 on the fifth display device 742. After step 1372, the method advances to step 1374.

At step 1374, the customer selects the "authenticate product" option on the login web page 770. After step 1374, method advances to step 1376.

At step 1376, the fifth computer 740 displays the product authentication web page 1090 on the fifth display device 742. After step 1376, the method advances to step 1378.

At step 1378, the customer inputs (1) a product name, and (2) a retailer name associated with a retailer who sold the product to the consumer, utilizing the product authentication web page 1090. After step 1378, the method advances to step 1382.

At step 1382, the central computer server 610 makes a determination as to whether the retailer name corresponds to either the first retailer or the second retailer previously registered and certified by the manufacturer. If the value of step 1382 equals "yes", the method advances to step 1384. Otherwise, the method advances to step 1386.

At step 1384, the central computer server 610 generates a first notification message on the product authentication web page 1090 indicating the retailer associated with the retailer name is authorized to sell the product. After step 1384, the method is exited.

Referring again to step 1382, if the value of step 1382 equals "no", the method advances to step 1386. At step 1386, the central computer server 610 generates a second notification message on the authentication web page 1090 indicating the retailer associated with the retailer name is not authorized to sell the product. After step 1386, the method is exited.

The web pages described above have software instructions for receiving inputted data and commands from specific parties. In particular, web pages described above are programmed to receive inputted data and commands from specific parties. The inputted data and commands are transmitted to the central computer server 610 via the Internet 620.

The system and the method for certifying and monitoring commercial activity of manufacturers, distributors, and retailers in a product supply chain and certifying and monitoring their products provide a substantial advantage over other systems and methods. In particular, the system and method verifies that the manufacturer is registered with an identified state of incorporation. Thereafter, the system and method allow the manufacturer to select and certify the distributor and first and second retailers that will receive the product in the product supply chain. Further, the system and method monitor the commercial activity of the manufacturer, distributor, and first and second retailers and notifies the manufacturer if the distributors are shipping out more of the product and was received by the manufacturer during a predetermined time period, or if the retailers are selling more of the product than was received from the distributor during the predetermined time period.

The above-described methods can be at least partially embodied in the form of one or more computer readable media having computer-executable instructions for practicing the methods. The computer-readable media can comprise one or more of the following: hard drives, RAM memory, flash memory, and other computer-readable media known to those skilled in the art; wherein, when the computer-executable instructions are loaded into and executed by one or more computers or computer servers, the one or more computers or computer servers become an apparatus programmed to practice at least a portion of the methods.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A method for certifying and monitoring commercial activity of a manufacturer, distributors, and retailers in a product supply chain, comprising:
    logging into a central computer server that is owned and managed by a certification and monitoring company utilizing a login web page, by a manufacturer, the central computer server having a certification and monitoring software program that is programmed to generate the login web page, a manufacturer registration web page, a select distributor web page, a select retailer web page, a manufacturer shipment web page, a distributor shipment web page, and a notification web page;
    inputting a business name of a manufacturer and a state of incorporation associated with the business name utilizing the manufacturer registration web page;
    verifying whether the business name of the manufacturer is registered with the state of incorporation by accessing a database utilizing the central computer server;
    registering and certifying the manufacturer with the centralized certification and monitoring company utilizing the central computer server if the business name of the manufacturer is registered with the state of incorporation;
    after registering and certifying the manufacturer with the centralized certification and monitoring company then:
    selecting and certifying a distributor by the manufacturer, for a product manufactured by the manufacturer, utilizing the select distributor web page;
    selecting and certifying first and second retailers by the manufacturer, for the product, utilizing the select retailer web page;
    inputting a first quantity of the product shipped during a time period from the manufacturer to the distributor, by the manufacturer, utilizing the manufacturer shipment web page;
    inputting second and third quantities of the product shipped during the time period from the distributor to the first and second retailers, by the distributor, utilizing the distributor shipment web page; and
    if a sum of the second and third quantities is greater than the first quantity by a predetermined amount, then generating a first notification message on the notification web page associated with the manufacturer, the first notification message indicating that the distributor has shipped an amount of the product greater than an amount of the product received from the manufacturer during the time period.

2. The method of claim 1, further comprising:
    inputting at least one of a business address of the manufacturer, a telephone number of the manufacturer, an email address associated with the manufacturer, and a contact person name associated with the manufacturer, by the manufacturer, utilizing the manufacturer registration web page.

3. The method of claim 1, wherein the certification and monitoring software program is further programmed to generate a product web page; the method further comprising:
    inputting a product name associated with the product, a product serial number associated with the product, and a product model number associated with the product, utilizing the product web page.

4. The method of claim 1, wherein selecting and certifying the distributor by the manufacturer, for the product manufactured by the manufacturer, utilizing the select distributor web page, comprises:
    inputting at least one of a business name of the distributor, an address of the distributor, a telephone number of the distributor, and an email address of the distributor, by the manufacturer, utilizing the select distributor web page.

5. The method of claim 1, wherein selecting and certifying the first and second retailers by the manufacturer, for the product, utilizing the select retailer web page, comprises:
    inputting at least one of a business name of the first retailer, an address of the first retailer, a telephone number of the first retailer, and an email address of the first retailer, by the manufacturer, utilizing the select retailer web page; and
    inputting at least one of a business name of the second retailer, an address of the second retailer, a telephone number of the second retailer, and an email address of the second retailer, by the manufacturer, utilizing the select retailer web page.

6. The method of claim 1, wherein inputting the first quantity of the product shipped during the time period from the manufacturer to the distributor, by the manufacturer, utilizing the manufacturer shipment web page, comprises:
    inputting the first quantity of the product shipped and a date of shipment of the product during the time period, and further inputting at least one of a product name associated with the product, a product serial number associated with the product, and a product model number associated with the product, by the manufacturer, utilizing the manufacturer shipment web page; and
    inputting at least one of a business name of the distributor, an address of the distributor, by the manufacturer, utilizing the manufacturer shipment web page.

7. The method of claim 1, wherein inputting second and third quantities of the product shipped during the time period from the distributor to the first and second retailers, by the distributor, utilizing the distributor shipment web page, comprises:

inputting the second quantity of the product shipped and a date of shipment of the product during the time period, and further inputting at least one of a product name associated with the product, a product serial number associated with the product, and a product model number associated with the product, by the distributor, utilizing the distributor shipment web page;

inputting at least one of a business name of the first retailer and an address of the first retailer, by the distributor, utilizing the distributor shipment web page;

inputting the third quantity of the product shipped and a date of shipment of the product during the time period, and further inputting at least one of the product name associated with the product, the product serial number associated with the product, and the product model number associated with the product, by the distributor, utilizing the distributor shipment web page; and inputting at least one of a business name of the second retailer and an address of the second retailer, by the distributor, utilizing the distributor shipment web page.

8. The method of claim 1, wherein the certification and monitoring software program is further programmed to generate a de-certification web page, the method further comprising:

inputting a business name of the distributor, by the manufacturer, on the de-certification web page.

9. The method of claim 1, wherein the certification and monitoring software program is further programmed to generate a retailer web page, the method further comprising:

inputting a fourth quantity of the product sold by the first retailer during the time period, by the first retailer, utilizing the retailer web page;

inputting a fifth quantity of the product sold by the second retailer during the time period, by the second retailer, utilizing the retailer web page;

if a sum of the fourth and fifth quantities is greater than the first quantity by a predetermined amount, then generating a second notification message on the notification web page associated with the manufacturer, the second notification message indicating that the first and second retailers have sold an amount of the product greater than an amount of the product originally shipped by the manufacturer to the distributor during the time period.

10. The method of claim 9, wherein the certification and monitoring software program is further programmed to generate a de-certification web page:

inputting a business name of at least one of the distributor, the first retailer, and the second retailer, by the manufacturer, on the de-certification web page.

11. The method of claim 1, wherein the certification and monitoring software program is further programmed to generate a product authentication web page, the method further comprising:

inputting a product name associated with the product, by a customer, utilizing the product authentication web page;

inputting a retailer name associated with a retailer who sold the product to the customer, by the customer, utilizing the product authentication web page;

determining whether the retailer name corresponds to either the first retailer or the second retailer utilizing the central computer server; and generating a first notification message on the product authentication web page indicating the retailer associated with the retailer name is authorized to sell the product, if the retailer name corresponds to either the first retailer or the second retailer.

12. The method of claim 11, further comprising:

generating a second notification message on the product authentication web page indicating the retailer associated with the retailer name is not authorized to sell the product, if the retailer name does not correspond to either the first retailer or the second retailer.

13. A system for certifying and monitoring commercial activity of a manufacturer, distributors, and retailers in a product supply chain, comprising:

a central computer server that is owned and managed by a certification and monitoring company, the central computer server having a certification and monitoring software program that is programmed to generate a login web page, a manufacturer registration web page, a select distributor web page, a select retailer web page, a manufacturer shipment web page, a distributor shipment web page, and a notification web page;

a computer programmed to operably communicate with the central computer server, the computer being operably coupled to a display device, the computer further programmed to induce the display device to selectively display the login web page, the manufacturer registration web page, the select distributor web page, the select retailer web page, the manufacturer shipment web page, the distributor shipment web page, and the notification web page;

the manufacturer registration web page programmed to receive an inputted business name of the manufacturer and a state of incorporation associated with the business name, from the manufacturer;

the central computer server further programmed to verify whether the business name of the manufacturer is registered with the state of incorporation by accessing a database;

the central computer server further programmed to register and certify the manufacturer with the centralized certification and monitoring company if the business name is registered with the state of incorporation;

after the central computer server registers and certifies the manufacturer with the centralized certification and monitoring company then:

the select distributor web page programmed to receive data to select and to certify a distributor, from a manufacturer, for a product manufactured by the manufacturer;

the select retailer web page programmed to receive data to select and certify first and second retailers, from the manufacturer, for the product;

the manufacturer shipment web page programmed to receive an inputted first quantity of the product shipped during a time period from the manufacturer to the distributor, from the manufacturer;

the distributor shipment web page programmed to receive inputted second and third quantities of the product shipped during the time period from the distributor to the first and second retailers, from the distributor;

the central computer server further programmed to determine whether a sum of the second and third quantities is greater than the first quantity by a predetermined amount; and the central computer server further programmed to generate a first notification message on the notification web page associated with the manufacturer, the first notification message indicating that the distributor has shipped an amount of the product greater than an amount of the product received from the manufacturer during the time period, if the sum of the second and third quantities is greater than the first quantity by the predetermined amount.

14. The system of claim 13, wherein the manufacturer web page is further programmed to receive inputted data corresponding to at least one of a business address of the manufacturer, a telephone number of the manufacturer, an email address associated with the manufacturer, and a contact person name associated with the manufacturer, by the manufacturer.

15. The system of claim 13, wherein:
the certification and monitoring software program is further programmed to generate a product web page; and
the product web page is programmed to receive inputted data corresponding to at least one of a product name associated with the product, a product serial number associated with the product, and a product model number associated with the product.

16. The system of claim 13, wherein:
the select distributor web page is further programmed to receive inputted data corresponding to at least one of a business name of the distributor, an address of the distributor, a telephone number of the distributor, and an email address of the distributor, by the manufacturer, for selecting and certifying the distributor by the manufacturer.

17. The system of claim 13, wherein:
the select retailer web page is further programmed to receive inputted data corresponding to at least one of a business name of the first retailer, an address of the first retailer, a telephone number of the first retailer, and an email address of the first retailer, by the manufacturer for selecting and certifying the first retailer; and
the select retailer web page is further programmed to receive inputted data corresponding to at least one of a business name of the second retailer, an address of the second retailer, a telephone number of the second retailer, and an email address of the second retailer, by the manufacturer for selecting and certifying the second retailer.

18. The system of claim 1, wherein:
the manufacturer shipment web page is further programmed to receive inputted data corresponding to at least one of a date of shipment of the product during the time period, a product name associated with the product, a product serial number associated with the product, and a product model number associated with the product, by the manufacturer; and
the manufacturer shipment web page is further programmed to receive inputted data corresponding to at least one a business name of the distributor, an address of the distributor, by the manufacturer.

19. The system of claim 13, wherein:
the distributor shipment web page is further programmed to receive inputted data corresponding to a date of shipment of the product during the time period, and at least one of a product name associated with the product, a product serial number associated with the product, and a product model number associated with the product, by the distributor;
the distributor shipment web page is further programmed to receive inputted data corresponding to at least one of a business name of the first retailer and an address of the first retailer, by the distributor;
the distributor shipment web page is further programmed to receive inputted data corresponding to a date of shipment of the product during the time period, and at least one of the product name associated with the product, the product serial number associated with the product, and the product model number associated with the product, by the distributor; and
the distributor shipment web page is further programmed to receive inputted data corresponding to at least one of a business name of the second retailer and an address of the second retailer, by the distributor.

20. The system of claim 13, wherein:
the certification and monitoring software program is further programmed to generate a product authentication web page:
the product authentication web page is further programmed to receive inputted data corresponding to a product name associated with the product, by a customer;
the product authentication web page is further programmed to receive inputted data corresponding to a retailer name associated with a retailer who sold the product to the customer, by the customer;
the central computer server is further programmed to determine whether the retailer name corresponds to either the first retailer or the second retailer;
the central computer server is further programmed to generate a first notification message on the product authentication web page indicating the retailer associated with the retailer name is authorized to sell the product, if the retailer name corresponds to either the first retailer or the second retailer.

* * * * *